(12) United States Patent
Li

(10) Patent No.: US 11,016,312 B2
(45) Date of Patent: May 25, 2021

(54) DIMMABLE EYEWEAR

(71) Applicant: Wicue, Inc., Cupertino, CA (US)

(72) Inventor: Fenghua Li, Cupertino, CA (US)

(73) Assignee: WICUE, INC., Cupertino, CA (US)

( * ) Notice: Subject to any disclaimer, the term of this patent is extended or adjusted under 35 U.S.C. 154(b) by 0 days.

(21) Appl. No.: 16/569,374

(22) Filed: Sep. 12, 2019

(65) Prior Publication Data

US 2020/0089025 A1 Mar. 19, 2020

Related U.S. Application Data

(60) Provisional application No. 62/822,331, filed on Mar. 22, 2019, provisional application No. 62/730,800, filed on Sep. 13, 2018.

(51) Int. Cl.
| | |
|---|---|
| *G02F 1/133* | (2006.01) |
| *G02C 7/10* | (2006.01) |
| *G02C 7/12* | (2006.01) |
| *G02C 11/00* | (2006.01) |
| *G02F 1/1335* | (2006.01) |
| *G02F 1/1337* | (2006.01) |
| *G02F 1/137* | (2006.01) |

(52) U.S. Cl.
CPC ............. *G02C 7/101* (2013.01); *G02C 7/104* (2013.01); *G02C 7/12* (2013.01); *G02C 11/10* (2013.01); *G02F 1/137* (2013.01); *G02F 1/13318* (2013.01); *G02F 1/133528* (2013.01); *G02F 1/133784* (2013.01); *G02F 1/13312* (2021.01); *G02F 1/13324* (2021.01); *G02F 1/133531* (2021.01)

(58) Field of Classification Search
CPC .................................................. G02F 1/13318
See application file for complete search history.

(56) References Cited

U.S. PATENT DOCUMENTS

| | | | |
|---|---|---|---|
| 5,184,156 A | 2/1993 | Black et al. | |
| 2008/0252801 A1* | 10/2008 | Furuta | H04N 9/3167 349/9 |
| 2009/0213283 A1 | 8/2009 | Burlingame et al. | |
| 2014/0152632 A1* | 6/2014 | Shedletsky | G01J 1/4204 345/207 |

(Continued)

FOREIGN PATENT DOCUMENTS

| | | |
|---|---|---|
| CN | 206096661 U | 4/2017 |
| EP | 0341519 A2 | 11/1989 |

(Continued)

OTHER PUBLICATIONS

PCT/US2019/051007, "International Search Report and Written Opinion", dated Jan. 31, 2020, 18 pages.

(Continued)

*Primary Examiner* — Edmond C Lau
(74) *Attorney, Agent, or Firm* — Weaver Austin Villeneuve & Sampson LLP

(57) ABSTRACT

In one example, an eyewear is provided. The eyewear comprises: a lens assembly including a lens and a liquid crystal layer formed on the lens, and a driver circuit coupled with the liquid crystal layer, the driver circuit configured to apply a signal to the liquid crystal layer based on an indication of an intensity of the ambient light to control a light transmittance of the lens assembly.

16 Claims, 21 Drawing Sheets

(56) References Cited

U.S. PATENT DOCUMENTS

2017/0068112 A1 3/2017 Bhatta et al.
2018/0188538 A1* 7/2018 Bell ..................... G02B 27/017
2018/0321523 A1* 11/2018 Robinson .............. G02F 1/1343
2019/0391447 A1* 12/2019 Kato ................. G02F 1/133555

FOREIGN PATENT DOCUMENTS

EP 3241674 A1 11/2017
GB 2152661 A 8/1985

OTHER PUBLICATIONS

PCT/US2019/051007, "Invitation to Pay Additional Fees and, Where Applicable, Protest Fee", dated Dec. 4, 2019, 12 pages.

* cited by examiner

DIMMABLE EYEWEAR

RELATED APPLICATION

This patent application claims priority to U.S. Provisional Patent Application Ser. No. 62/730,800, filed Sep. 13, 2018, entitled "Liquid Crystal Sunglass and Multicolor Liquid Crystal Writing Device," and to U.S. Provisional Patent Application Ser. No. 62/822,331, filed Mar. 22, 2019, entitled "Dimmable Eyewear," which are assigned to the assignee hereof and is incorporated herein by reference in its entirety for all purposes.

BACKGROUND

The disclosure relates generally to eyewear, and more specifically, to dimmable eyewear based on liquid-crystal technology.

Protective eyewear, such as sunglasses, can prevent high-energy light (e.g., sunlight) from damaging or discomforting the eyes. Sunglasses typically include lens that can block off and/or absorb at least some of the light to reduce the intensity of light entering the eyes, to protect the eyes from high-energy light. The lens may include, for example, a polarizer layer, a colored coating, etc., having a pre-configured light transmittance to block off and/or absorb a certain ratio of light power to prevent the eyes from receiving the full light power.

Although sunglasses can protect the eyes from high-energy light, sunglasses having a fixed light transmittance can create inconvenience to the user, especially as the user moves from an environment with relatively strong light intensity (e.g., outdoor) to an environment with relatively low light intensity (e.g., indoor or road tunnel). Because the sunglasses block off and/or absorb the same ratio of light power even in the low light environment, the visual perception of the user wearing the sunglasses can be significantly hampered in the low light environment. As a result, the user may need to take off the sunglasses in the low light environment, which degrades user experience.

SUMMARY

The disclosure relates generally to eyewear, and more specifically, to dimmable eyewear based on liquid-crystal technology.

In one example, an eyewear is provided. The eyewear comprises a lens assembly including a lens and a liquid crystal layer formed on the lens. The eyewear further comprises a driver circuit coupled with the liquid crystal layer, the driver circuit configured to apply a signal to the liquid crystal layer based on an indication of an intensity of ambient light to control a light transmittance of the lens assembly.

In one aspect, the lens assembly further includes a first polarizer layer and a second polarizer layer. The lens and the liquid crystal layer are sandwiched between the first polarizer layer and the second polarizer layer. The liquid crystal layer comprises twist-nematic (TN) liquid crystal devices.

In one aspect, the lens is configured to selectively pass visible light of a frequency range associated with an orange color, such that light passed by the lens and by the first and second polarizer layers combine to have a white color.

In one aspect, the lens assembly further comprises a membrane between the lens and the first polarizer layer. The membrane is configured to reduce a birefringence effect exerted by the lens on the ambient light transmitted by the lens.

In one aspect, the TN liquid crystal devices have a twist angle range between 0 and 90 degrees. A first absorption axis of the first polarizer layer and a second absorption axis of the second polarizer layer forms 90 degrees.

In one aspect, the TN liquid crystal devices have a twist angle range between 0 and 110 degrees. A first absorption axis of the first polarizer layer and a second absorption axis of the second polarizer layer forms 110 degrees.

In one aspect, the liquid crystal layer includes at least one of: Guest-Host liquid crystal devices, electrically controlled birefringence (ECB) crystal devices, or Pi-cells.

In one aspect, the liquid crystal layer is sandwiched between a first substrate and a second substrate. The first substrate and the second substrate have different rubbing arrangements. An orientation of liquid crystal molecules of the liquid crystal layer vary between a homogeneous planar orientation and a homeotropic orientation in response to a signal applied by the driver circuit.

In one aspect, the eyewear further comprises a sensor coupled with the liquid crystal layer and with the driver circuit. The sensor is configured to generate sensor data based on the intensity of the ambient light. The driver circuit is configured to control the signal based on the sensor data.

In one aspect, the sensor comprises one or more solar cells.

In one aspect, the eyewear further comprises one or more transparent membranes comprising the one or more solar cells. The one or more transparent membranes are attached on at least one of the lens or the liquid crystal layer.

In one aspect, the eyewear further comprises a housing to enclose the one or more solar cells and the driver circuit. The housing further comprises a pin hole to expose the one or more solar cells to the ambient light.

In one aspect, the lens assembly is a first lens assembly comprising a first lens and a first liquid crystal layer. The eyewear comprises a second lens assembly comprising a second lens and a second liquid crystal layer. The eyewear comprises a connection structure to connect the first lens assembly and the second lens assembly. The housing is attached on the connection structure.

In one aspect, the housing is attached on the lens assembly.

In one aspect, the eyewear further comprises a light guide positioned between the pin hole and the one or more solar cells. The light guide is configured to: receive a narrow beam of ambient light received via the pin hole; convert the narrow beam into a sheet of ambient light; and direct the sheet of ambient light towards the one or more solar cells.

In one aspect, the light guide comprises an Acyclic material.

In one aspect, the eyewear further comprises a coating to partially cover the housing.

In one aspect, the eyewear further comprises a switch that enables a user to select the light transmittance of the lens assembly based on intensity of the ambient light. The driver circuit is configured to control the light transmittance of the lens assembly based on the selection from the switch.

In one aspect, the eyewear further comprises a camera positioned behind the lens assembly, the camera configured to receive light via the lens assembly to generate images. The eyewear further comprises a coating overlaid on a portion of the lens assembly and the camera, the coating configured to set an optical property of the portion of the lens assembly independently from the rest of the lens assembly.

In one aspect, the eyewear further comprises at least one of: a wireless interface to transmit and to receive radio signals; or an audio interface to input and output audio signals.

BRIEF DESCRIPTION OF THE DRAWINGS

Illustrative embodiments are described with reference to the following figures.

Figure 1A:
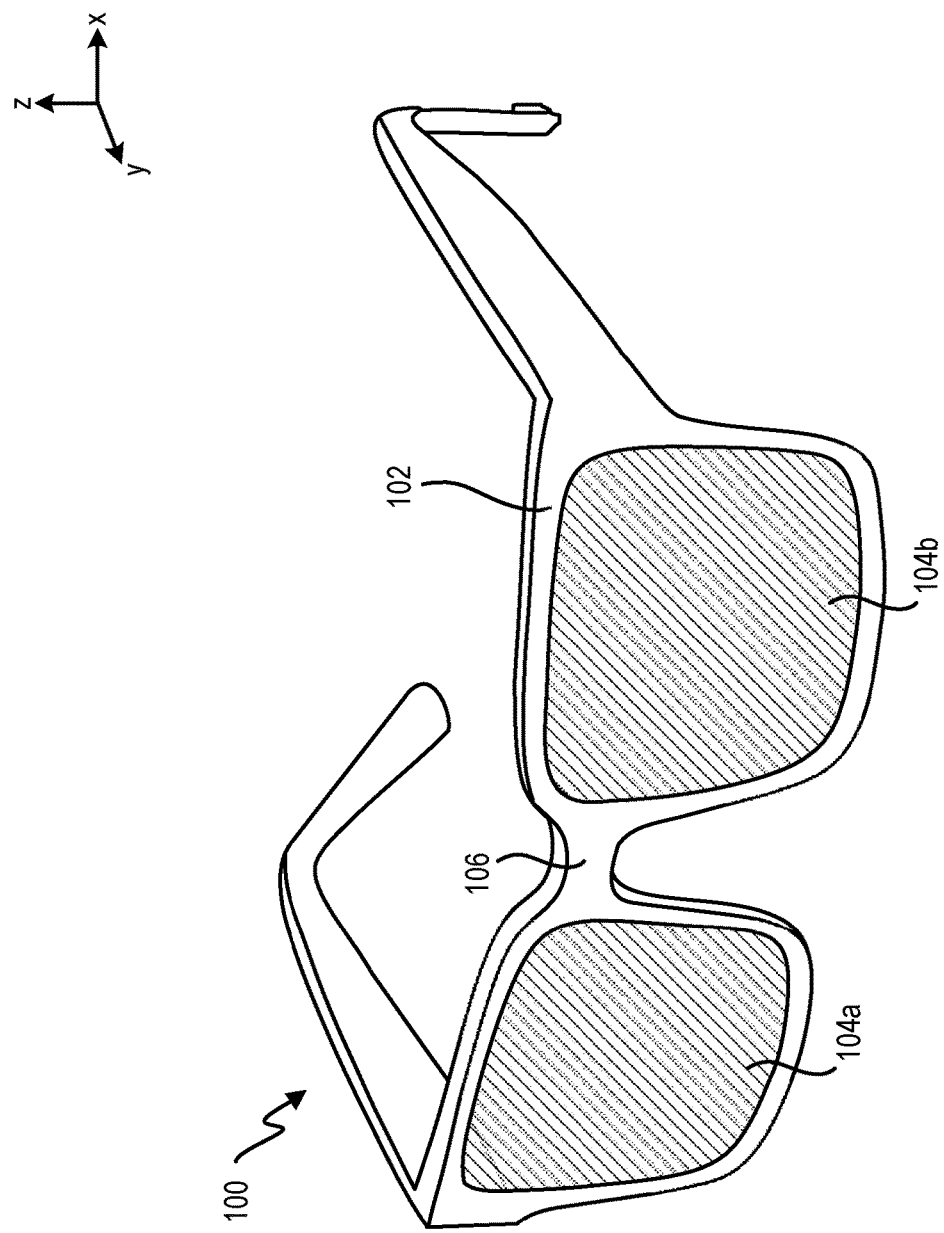
FIG. 1A, FIG. 1B, FIG. 1C, and FIG. 1D illustrate an example of a dimmable eyewear and its operations, according to embodiments of the present disclosure.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive.

Protective eyewear, such as sunglasses, can prevent high-energy light (e.g., sunlight) from damaging or discomforting the eyes. Sunglasses typically include lens that can block off and/or absorb a certain ratio of light power to prevent the eyes from receiving the full light power. Although sunglasses can protect the eyes from high-energy light, the visual perception of the user wearing the sunglasses can be significantly hampered in the low light environment due to the absorption/blocking off of light power. As a result, the user may need to take off the sunglasses in the low light environment, which degrades user experience.

Embodiments of the present disclosure provide a dimmable eyewear which can address the problems described above. The eyewear comprises a lens assembly and a circuit. The lens assembly comprises a lens and a liquid crystal layer formed on the lens. The driver circuit is coupled with the liquid crystal layer and is configured to apply, based on an indication of an intensity of the ambient light, a signal to the liquid crystal layer to adjust the orientation of the liquid crystal molecules. The orientation adjustment of the liquid crystal molecules causes an adjustment to a light transmittance of the lens assembly based on the ambient light intensity.

The liquid crystal layer can adjust the transmittance of the lens assembly based on various mechanisms including, for example, twisted nematic (TN) effect, Guest-Host effect, electrically controlled birefringence (ECB), Pi-cells, etc. In all these examples, the driver circuit can adjust an electric field across the liquid crystal layer to adjust the orientations and alignments of the liquid crystal molecules in the liquid crystal layer, which can change the portion of incident light that passes through the lens assembly to the user's eyes, thereby adjusting the light transmittance of the lens assembly. The driver circuit can adjust the electric field based on the ambient light intensity. For example, the driver circuit can adjust the electric field to increase the light transmittance of the lens assembly in a low light environment (e.g., indoor), and to decrease the light transmittance of the lens assembly in a high light environment (e.g., outdoor).

The driver circuit can receive the ambient light intensity information from various sources. In some examples, the dimmable eyewear may include optical sensors to sense the ambient light intensity. One example of the optical sensors can be solar cell, which can generate a voltage (or a current) that reflects the ambient light intensity, and provide the voltage/current to the driver circuit to generate a corresponding electric field for the liquid crystal layer. In some examples, one or more solar cells can be enclosed within a housing. The housing can be part of a connection structure that connects a pair of lens assemblies to form the eyewear, or can be behind the lens assembly of the eyewear for better appearance. The housing may further include a pin hole to expose the solar cells to the ambient light. A light guide may be provided between the pin hole and the solar cells to more uniformly distribute the ambient light over the solar cells surfaces, such that the solar cells output can better represent the ambient light intensity. In some examples, the eyewear may include switches which allow the user to select the light transmittance of the lens assembly, and the driver circuit can adjust the light transmittance of the lens assembly based on the user's selection.

Additional configurations are proposed to further improve user experience. For example, the lens assembly may include a pair of polarizers to sandwich the liquid crystal layer in between to create adjustable light transmittance based on the polarization angle of polarized light controlled by the liquid crystal layer. To reduce visual artifacts (e.g., a black-belt) caused by varying light absorption rate by the polarizers and perceived by the user via the eyewear, a slight mismatch can be introduced between the angle of rotation of the polarized light by the liquid crystal layer with respect to the angle between the polarization axes of the polarizers. As another example, the lens assembly may include an extra polyester film, such as Super Retarder Film (SRF®), to reduce or eliminate rainbow mura caused by birefringence of the lens followed by interferences at the polarizer layers and perceived by the user. As another example, the lens of the lens assembly can be configured to selectively pass visible light of a particular frequency range (e.g., an orange color) to compensate for the selective absorption of light by the two polarizers and for the retardation of visible light by the liquid crystal layer, which can improve visual perception of the user via the eyewear.

With embodiments of the present disclosure, the eyewear can adjust the light transmittance based on ambient light intensity, which allows the user to have a good visual perception via the eyewear irrespective of the environment the user is located in, while being protected from exposure to high-energy light. The user experience can be improved as a result.

Figure 1B:
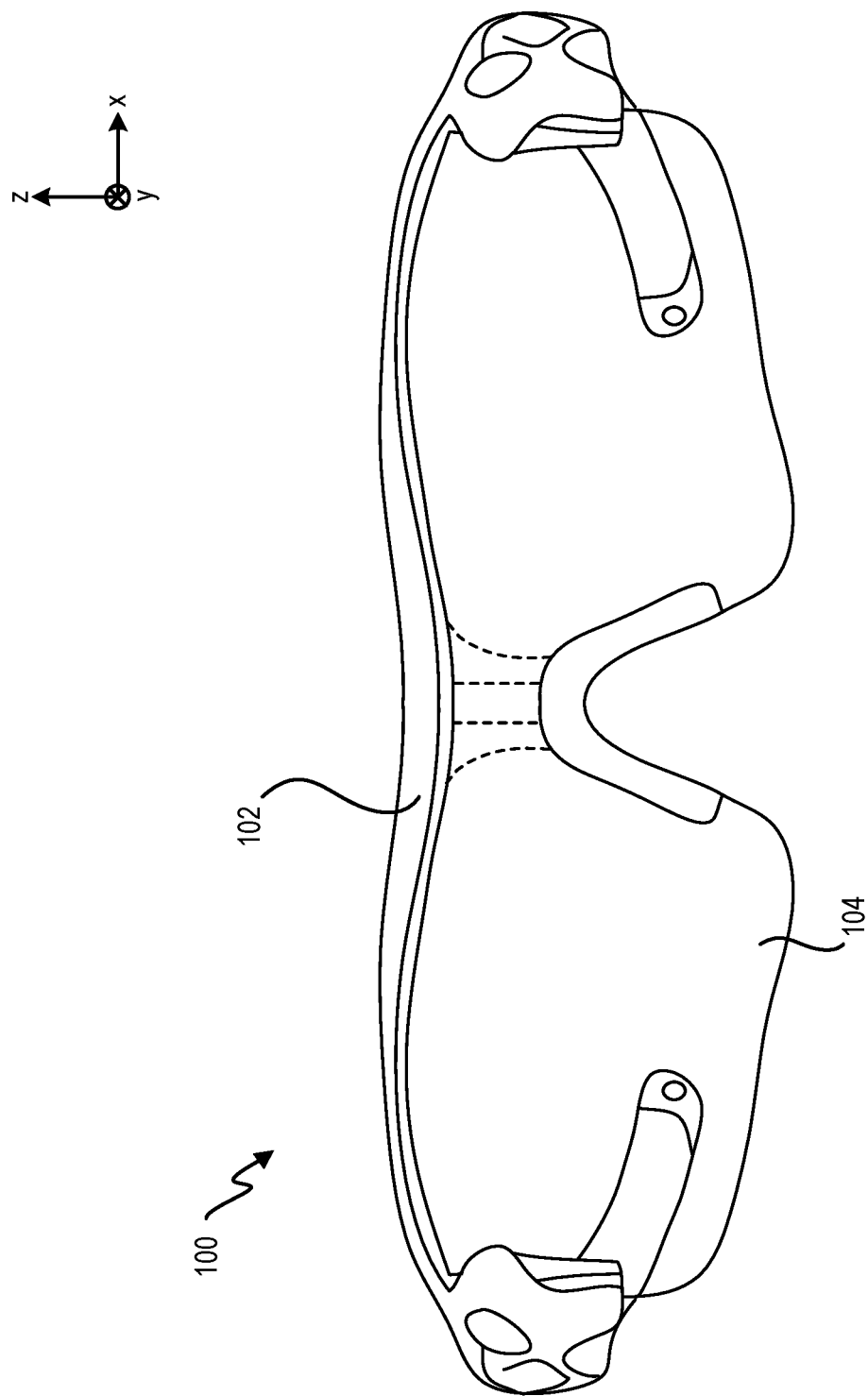
Figure 1C:
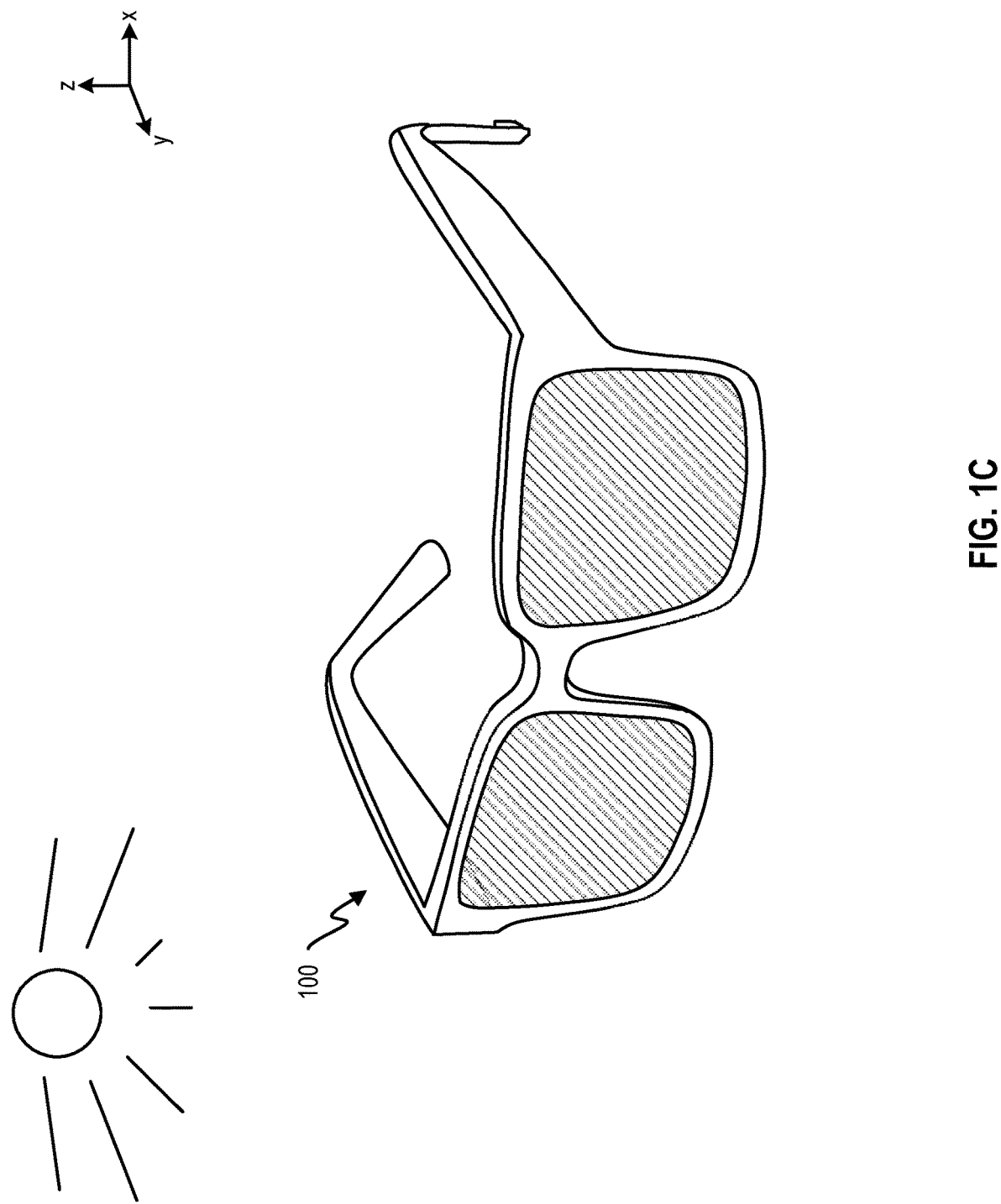
Figure 1D:
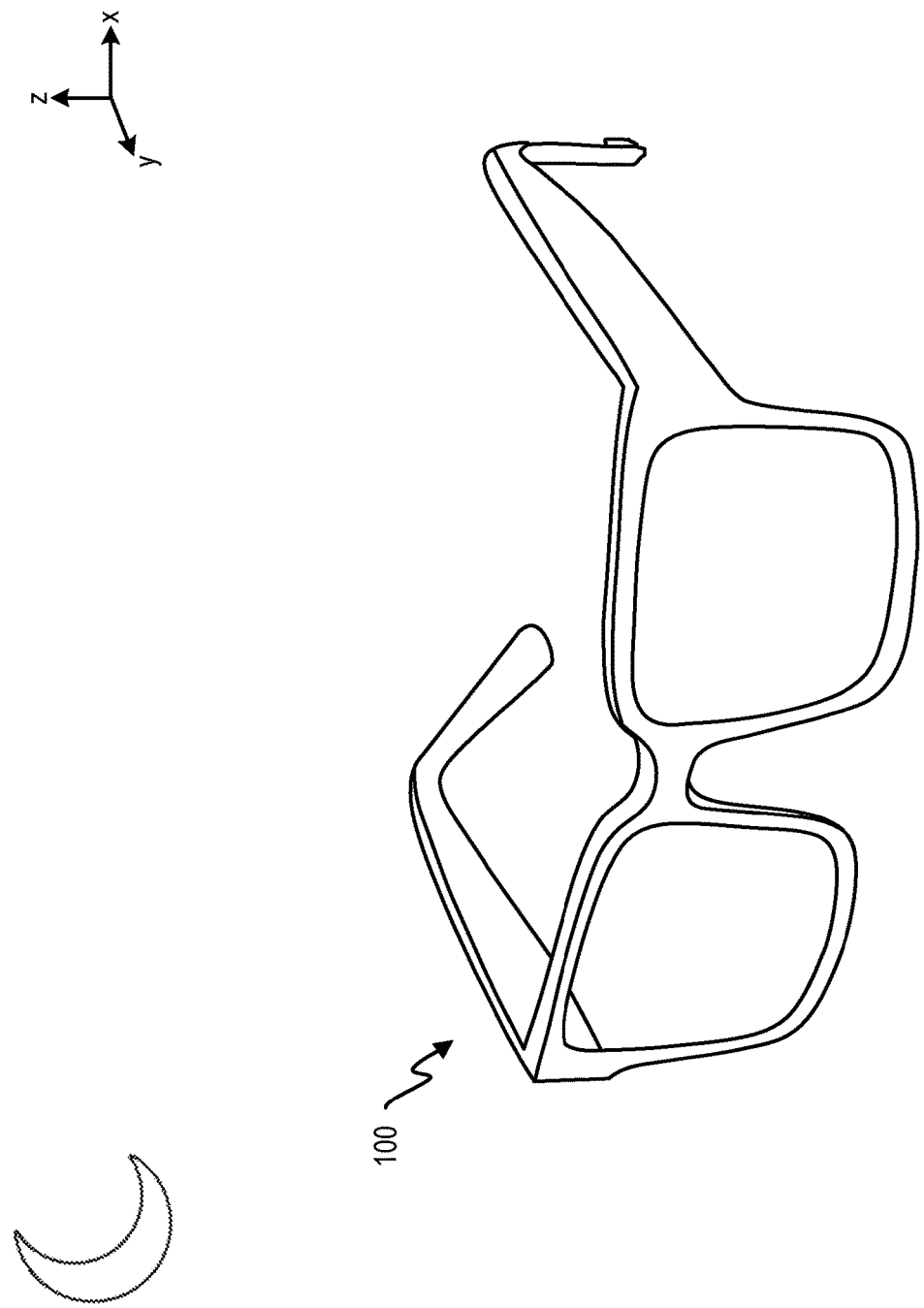

FIG. 1A, FIG. 1B, FIG. 1C, and FIG. 1D illustrate an example of a dimmable eyewear 100 and its operations, according to some embodiments. As shown in FIG. 1A, eyewear 100 includes an optional frame 102 and one or more lens assemblies 104. In the example of FIG. 1A, eyewear 100 may include two lens assemblies 104a and 104b connected by a connection structure 106. In the example of FIG. 1B, eyewear 100 may include a single lens assembly 104 held by frame 102. In some examples, eyewear 100 may be frameless, and may include a single lens assembly 104 or two lens assemblies 104a and 104b connected by connection structure 106. In both examples, one or more lens assemblies 104 can have configurable light transmittance which can be configured/adjusted based on an ambient light intensity. Specifically, as shown in FIG. 1C, in an environment with high ambient light intensity (e.g., outdoor under the sun), the light transmittance of one or more lens assemblies 104 can be reduced to reduce the intensity of light that passes through one or more lens assemblies 104 into user's eyes (not shown in FIG. 1A-FIG. 1D), to protect the eyes from exposure to high energy light. Moreover, as shown in FIG. 1D, in an environment with low ambient light intensity (e.g., outdoor at night, indoor, etc.) the light transmittance of one or more lens assemblies 104 can be increased, so that the user can maintain a reasonable vision when wearing eyewear 100 in the low light environment.

Figure 2A:
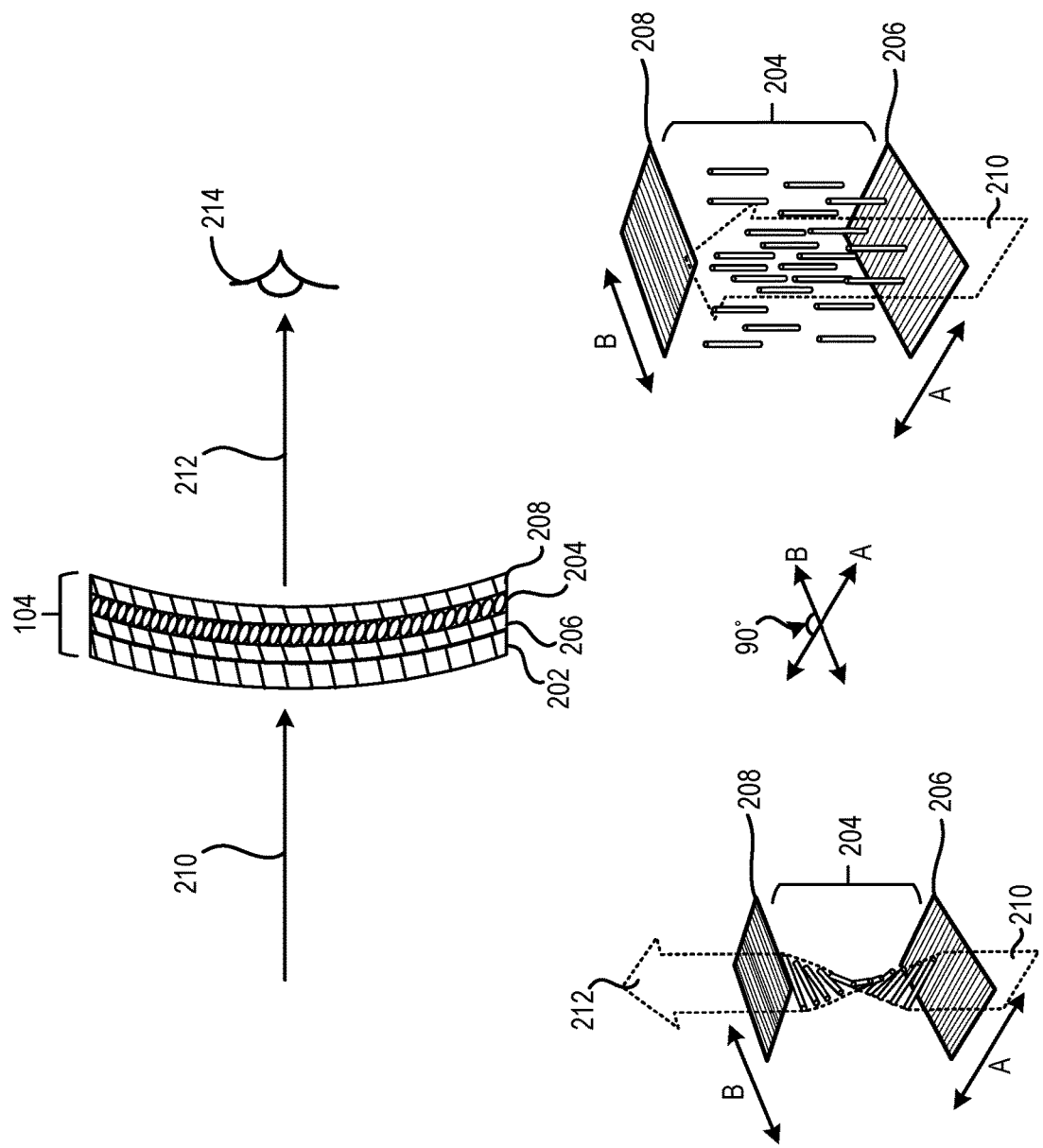
FIG. 2A, FIG. 2B, FIG. 2C, and FIG. 2D illustrate examples of a lens assembly of the dimmable eyewear of FIG. 1A-FIG. 1D, according to embodiments of the present disclosure.
Figure 2B:
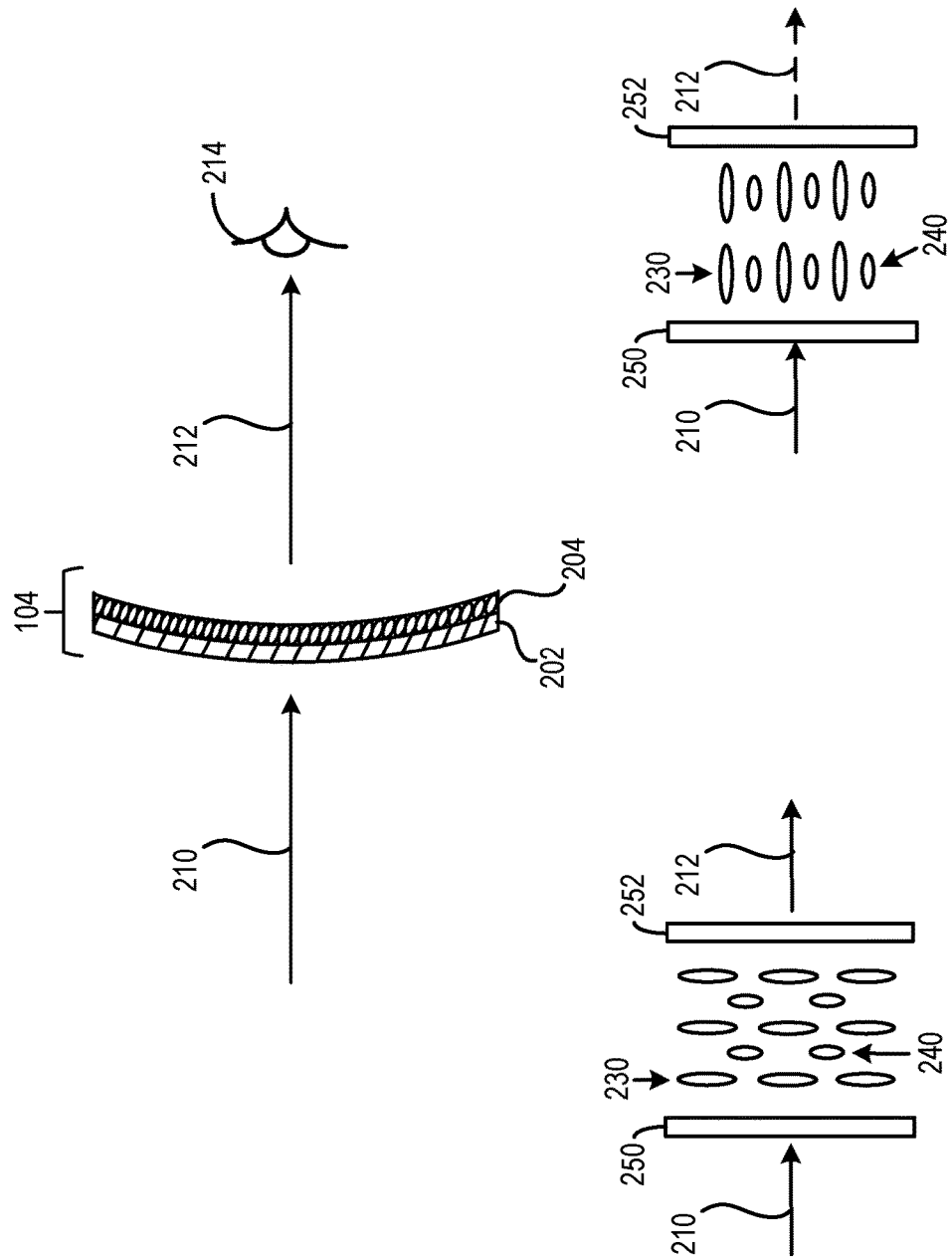

FIG. 2A and FIG. 2B illustrate examples of one or more lens assemblies 104, according to some embodiments. As shown in FIG. 2A, one or more lens assemblies 104 may include a lens 202, a liquid crystal layer 204, and optional first polarizer layer 206 and second polarizer layer 208. Incident light 210 can enter one or more lens assemblies 104 and exit one or more lens assemblies 104 as output light 212 which can enter user's eye 214. Lens 202 can be made of glass, polyester, polycarbonate, etc. In some examples, lens 202 can be flat to pass light without changing the light's property. In some examples, lens 202 can have a particular shape (e.g., being concave, convex, etc.) to vary the property of output light 212 to correct the user's vision (e.g., concave lens to correct myopia (near-sightedness), convex lens to correct hyperopia (far-sightedness), etc.). Near-sighted correction lens is usually spherically curved. Liquid crystal layer 204 can be made flexible but strong enough to survive three-dimensional deformation, to laminate liquid crystal 204 onto the near-sighted correction spherical lens.

Liquid crystal layer 204 can change the light transmittance of one or more lens assemblies 104 to adjust the portion of incident light 210 that passes through one or more lens assemblies 104 to become output light 212. FIG. 2A illustrates one example configuration of liquid crystal layer 204 to provide adjustable light transmittance. As shown in FIG. 2A, liquid crystal layer 204 can be configured as a twisted nematic (TN) liquid crystal layer which can rotate the polarization axis of polarized light as the polarized light traverses the liquid crystal layer, with the angle of rotation adjustable by an electric field applied by a driver circuit across the liquid crystal layer. For example, as shown in FIG. 2A, if no electric field is applied, the liquid crystal molecules can have a twisted configuration to form a helical structure. The helical structure causes the polarization axis of the polarized light to rotate by a certain angle (e.g., a 90 degree angle) as the polarized light traverses through the liquid crystal layer. Moreover, if an electric field is applied, the liquid crystal molecules can align in parallel with the electric field. The polarization axis of the polarized light can be maintained and not rotated as the light traverses the aligned liquid crystal molecules.

Liquid crystal layer 204 can be sandwiched between first polarizer layer 206 and second polarizer layer 208. First polarizer layer 206 can have a polarization axis A, whereas second polarizer layer 208 can have a polarization axis B. The two polarization axes can form a 90-degree angle with respect to each other. Incident light 210 can enter via lens 202 and become linearly polarized by first polarizer layer 206. The linearly polarized light can be rotated by liquid crystal layer 204 by an angle configured by the electric field as described above. The transmission rate of the linearly polarized light at zero field, labelled as $T_{NW}$ below, depends on wavelength according to the Gooch-Tarry theory, as follows:

$$T_{NW} = 1 - \frac{\sin^2(\emptyset\sqrt{1+u^2})}{1+u^2} \quad \text{(Equation 1)}$$

In Equation 1, $\emptyset$ can be the twist angle $$\left(\emptyset = \frac{\pi}{2} \text{ in } TN \text{ mode}\right)$$

and u can be a retardation index given by the following equation $$u = \frac{\pi \Delta n d}{\lambda \emptyset} \quad \text{(Equation 2)}$$

In Equation 2, $\lambda$ can be the wavelength, $\Delta n$ can be the birefringence of the liquid crystal mixture, whereas d is a constant.

Maximum light transmittance can be achieved in a case where no electric field is applied, such that liquid crystal layer 204 rotates the polarization axis of the polarized light such that it aligns with the polarization axis B of second polarizer layer 208. Minimum light transmittance can be achieved when the polarization axis of the polarized right is not rotated due to application of an electric field, such that the polarization axis of the polarized light is not rotated and becomes perpendicular to the polarization axis B of second polarizer layer 208. In such a case, the polarized light aligns with the absorption axis of second polarizer layer 208 and can be absorbed by second polarizer layer 208 at a maximum absorption rate. The electric field magnitude can be adjusted to adjust the angle of rotation of the polarized light, which can vary the portion of incident light 210 that passes through lens assemblies 104 as output light 212.

TN liquid crystal can provide various technical advantages. For example, TN liquid crystal typically has extremely fast response characteristics and can adjust the light transmittance within a very short period of time (e.g., 100 milliseconds or less). Moreover, TN liquid crystal can also provide good light block property. For example, the minimum light transmittance of TN liquid crystal can reach 0.1%. All these properties enable eyewear 100 to provide a wide configuration range of light transmittance as well as fast switching, which can improve user experience.

FIG. 2B illustrates another example configuration of liquid crystal layer 204 to provide adjustable light transmittance. As shown FIG. 2B, one or more lens assemblies 104 includes lens 202 and liquid crystal layer 204 but not first and second polarizer layers 206 and 208. Liquid crystal layer 204 can include liquid crystal molecules 230, which act as a host material, and dye molecules 240, which act as a guest material. Liquid crystal molecules 230 and dye molecules 240 are sandwiched between two substrates 250 and 252, which can be attached to or part of electrodes (not shown in FIG. 2B). Liquid crystal molecules 230 and dye molecules 240 can modulate the light transmittance of one or more lens assemblies 104 based on Guest-Host effect. Specifically, depending on the type of dye molecules 240, dye molecules 240 can absorb light having an electric field that is perpendicular to (or parallel with) the long axis of the dye molecules. When the driver circuit applies an electric field across liquid crystal molecules 230 between substrates 250 and 252, the orientation of liquid crystal molecules 230, as well as dye molecules 240, can be changed according to the electric field, which changes the relative orientation of the dye molecules with respect to the electric field of incident light 210. As a result, the portion of incident light 210 absorbed by dye molecules 240, and the light transmittance of one or more lens assemblies 104, can be adjusted by the electric field applied across liquid crystal layer 204.

Compared with TN liquid crystal, a liquid crystal layer that employs the Guest-Host effect needs not rely on a polarizer to absorb incident light, which can increase the overall achievable light transmittance of one or more lens assemblies 104, while providing reasonable light blocking properties. For example, using the Guest-Host effect, the light transmittance range can be between 10% to 80%. To obtain a 10% to 80% transmittance range, two Guest-Host cells can be provided with their absorption axes separated by 90 degrees. No chiral dopant (or a very small amount of chiral dopant) is added to the Guest-Host mixtures.

Figure 2C:
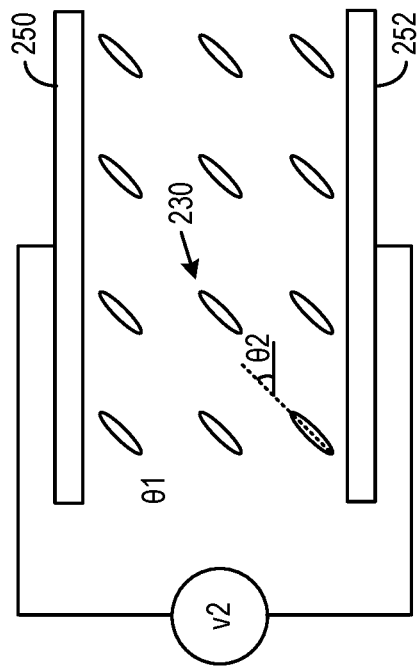
Figure 2C:
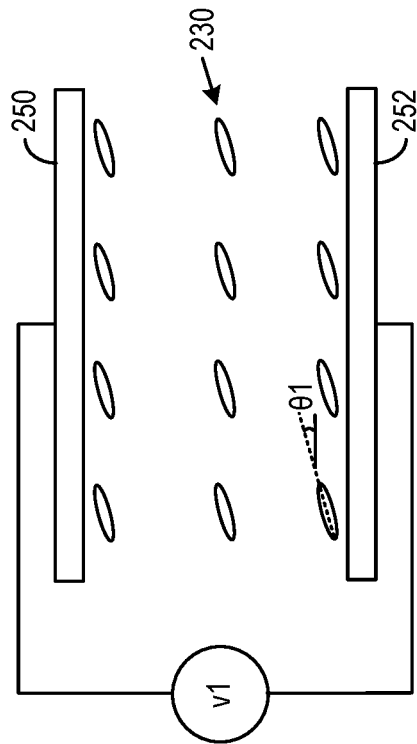

Other techniques to achieve variable light transmittance are proposed. In one example, substrates 250 and 252 can be rubbed. The rubbing creates grooves on the surfaces of the substrates, which introduce surface energy to set the initial orientation of liquid crystal molecules 230 to a homogeneous planar orientation, at which the light transmittance of the liquid crystal layer is at the minimum. As a voltage is applied across substrates 250 and 252, the electric field introduced between substrates 250 and 252 can counter the surface energy to tilt liquid crystal molecules 230 at an angle θ with respect to each substrate, and the tilting angle, which increases with the voltage, can increase the light transmittance of the liquid crystal layer. For example, as shown in FIG. 2C, with a voltage v1, liquid crystal molecules 230 tilt at an angle θ1 with respect to each substrate, whereas with a voltage v2, liquid crystal molecules 230 tilt at an angle θ2 with respect to each substrate. As the orientation of liquid crystal molecules 230 transitions towards a homeotropic orientation, the light transmittance increases.

In some examples, to achieve a largely continuously/monotonic variable light transmittance (e.g., transmittance increases when the voltage decreases, and vice versa), a non-balanced or asymmetric rubbing arrangements can be provided. For example, substrates 250 and 252 can have different densities of grooves and can introduce different levels of surface energies to liquid crystal molecules 230. Such arrangements can improve the stability of liquid crystal molecules 230 when the applied voltage is in the middle of the voltage range corresponding to the range of transmittance. Specifically, if the two substrates have similar rubbing and introduce similar surface energies, when the applied voltage is in the middle, the electric field may be countering two very similar surface energies at the same time. As a result, liquid crystal molecules 230 can become unstable and can exhibit different orientations, which can create domains and lead to haze, and an abrupt change of light transmittance may result. Having non-balanced or asymmetric rubbing arrangements between the substrates, an energy gradient can be formed between the two substrates, and the electric field from the applied voltage no longer counters two similar surface energies at the same time. This can improve the stability of liquid crystal molecules 230 and can ensure that liquid crystal molecules 230 are uniformly oriented in response to the voltage.

Figure 2D:
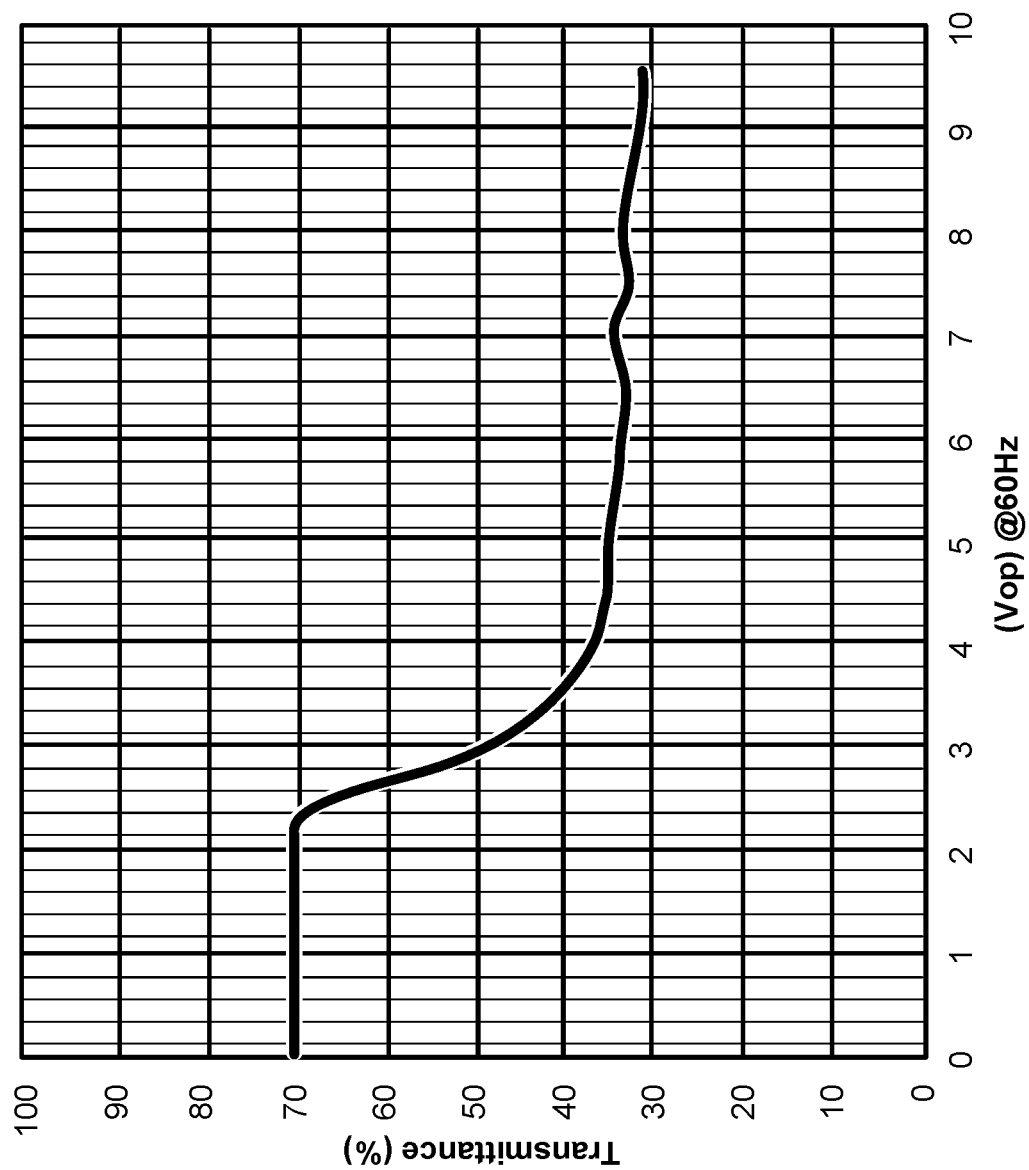

FIG. 2D illustrates a graph of light transmittance of liquid crystal layer 204 with respect to input voltage. AS shown in FIG. 2D, when a low voltage is applied across each cell, each cell can reorient the liquid crystal from a homeotropic to a homogeneous planar orientation, which can increase the light transmittance. When a high voltage is applied across each cell, each cell can be in the homeotropic planar orientation, which can reduce the light transmittance. Moreover, the light transmittance changes monotonically with respect to the voltage, including at the middle point (5V). With such arrangements, eyewear 100 can provide a wide configuration range of light transmittance, which can improve user experience.

Besides TN and Guest-Host effect, liquid crystal layer 204 can have other configurations to provide adjustable light transmittance. For example, liquid crystal layer 204 can be configured to provide electrically controlled birefringence (ECB). The ECB mode uses the applied voltage to change the tilt angle θ (also known as polar angle) of the liquid crystal molecules between the substrate normal and the molecule's long axis, which can change the birefringence of the liquid crystal. As another example, liquid crystal layer 204 can be configured as Pi-cells. The Pi-cell is also known as Optically Compensated Bend. In the Pi-cell, the pretilt angles on both substrates are in the same direction, also called parallel alignment of substrates. In Freedericksz ECB cells, the molecules may have a uniform alignment with a pretilt angle in the opposite direction on two substrates, also called anti-parallel alignment of substrates. An electric field can be applied across the Pi-cell and then the electric field can be switched off. The switching off of the electric field can cause the molecules to relax back to the original state, causing a flow of the molecules. The molecules in the mid-layer may be subject to a torque, which can cause a back-flow of the material and rotation of the molecules by a large angle to the original state. However this can slow down the switching speed. For Pi-cell, when the field is switched off, the molecules in the mid-layer is not subject to a torque when relaxing back to the off state. The molecules only rotates by a relatively small angle back to the original state, which can result in a faster switching speed.

In both examples of FIG. 2A and FIG. 2B, the driver circuit can apply an electric field applied across liquid crystal layer 204 to change the orientation and/or twist structure of the liquid crystal molecules. To reduce power consumption, liquid crystal layer 204 can be configured to have a relatively low switching threshold, such that a relatively weak electric field is needed to change the orientation and/or twist structure of the liquid crystal molecules. In some embodiments, the threshold voltage can be set at 0.6-0.8V. Various techniques can be used to reduce the threshold voltage of liquid crystal layer 204, such as choosing liquid crystal that has a very high dielectric anisotropy, high elastic constant, and extremely high purity. The threshold electric field equation for twist nematic can be as follows:

$$E_c = (\pi/h)\sqrt{K_{22}/\varepsilon_0 \Delta\varepsilon}$$ (Equation 3)

In Equation 3, h can be cell thickness, $K_{22}$ can be the twist elastic constant, and $\Delta\varepsilon$ can be the dielectric anisotropy of liquid crystal mixture.

The driver circuit can output an AC voltage across liquid crystal layer 204 to generate the electric field. An AC voltage can be provided to drive the electric field to improve reliability and to avoid damage to the liquid crystal, since impurities in the liquid crystal can keep a DC current flowing which can decompose the liquid crystal molecules. The magnitude of the AC voltage can be configured based on the threshold voltage of liquid crystal layer 204, as well as the ambient light intensity, such that the orientation and/or twisted angle of the liquid crystal molecules can reflect the ambient light intensity. With such arrangements, the light transmittance of one or more lens assemblies 104 can be configured based on the ambient light intensity.

Figure 3A:
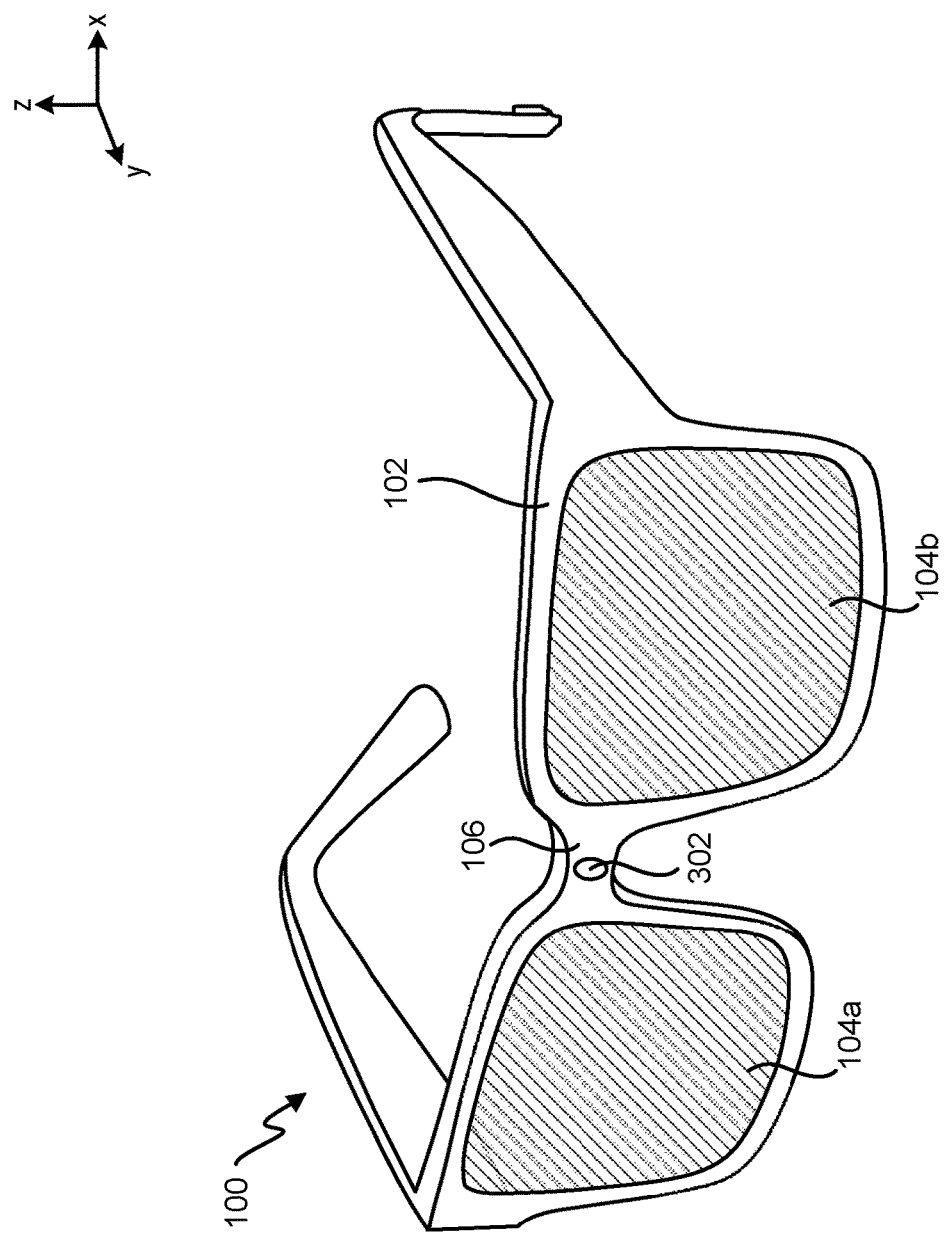
FIG. 3A, FIG. 3B, FIG. 3C, FIG. 3D, and FIG. 3E illustrate examples of a dimmable eyewear having an optical sensor, according to embodiments of the present disclosure.

The driver circuit can receive the ambient light intensity information from various sources. In some examples, the dimmable eyewear may include optical sensors to sense the ambient light intensity. FIG. 3A illustrates an example of eyewear 100 having an optical sensor 302 to sense the ambient light intensity. Optical sensor 302 can be positioned at, for example, connections structure 106, and/or any location on frame 102. Optical sensor 302 can include any device that can convert light into an electrical signal, such as photodiodes.

One example of optical sensor 302 can be photovoltaic cells, such as solar cells, which can provide a DC current or a DC voltage to the driver circuit that reflects the ambient light intensity. The solar cells can also provide electric power to the driver circuit such that no battery is needed, which can reduce the weight and size of eyewear 100. The driver circuit can include a power converter to convert the DC current/voltage to the AC voltage to generate the electric field across liquid crystal layer 204. In some examples, the solar cells can include miniature silicon-based solar cells having a rectangular shape and can have a range of dimensions between 6 millimeters (mm)×8 mm to 10 mm×10 mm.

Figure 3B:
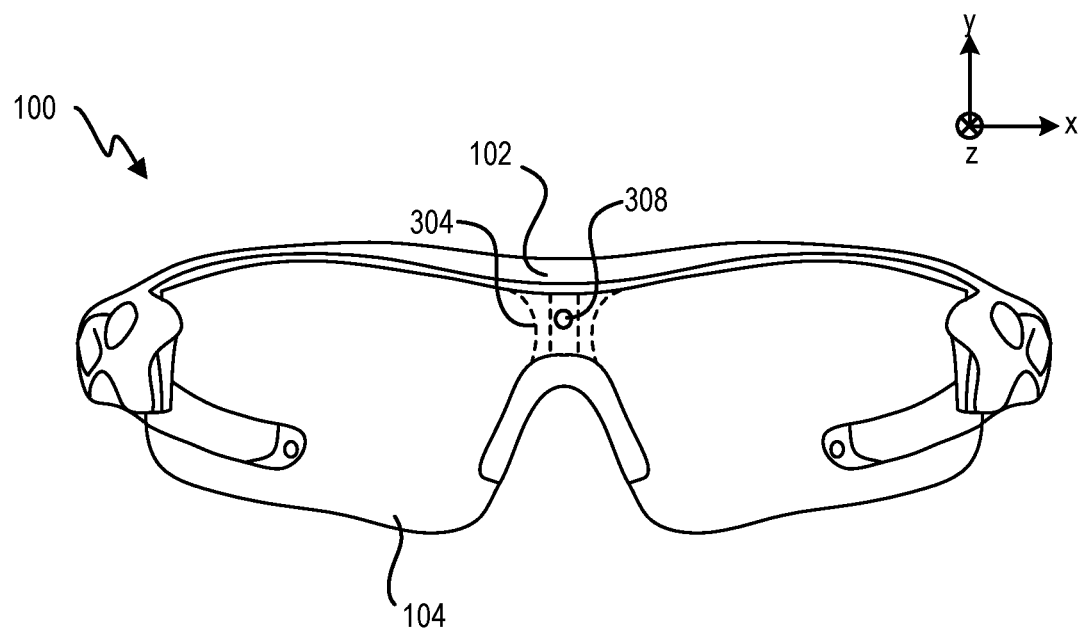
Figure 3B:
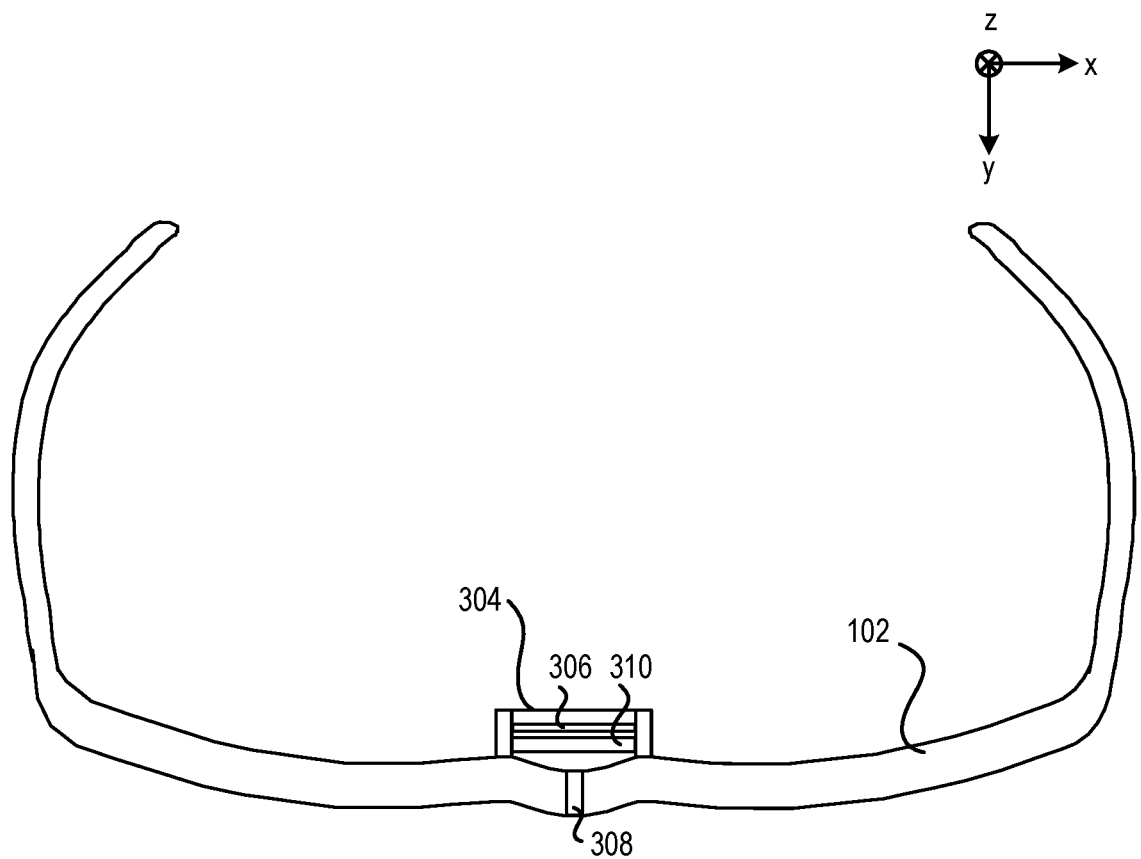

FIG. 3B-FIG. 3E illustrate an example configuration of the solar cells in eyewear 100. As shown in FIG. 3B, eyewear 100 can include a housing 304 to enclose solar cells 306. Housing 304 can be positioned on frame 102 and behind lens assembly 104 (on a side facing the user, towards negative Y direction). Housing 304 also encloses the driver circuit which can be electrically connected to electrodes housed within frame 102. The driver circuit can receive the DC current/voltage from solar cells 306 and generate a corresponding AC voltage, and transmit the AC voltage to the electrodes to generate a variable electric field across liquid crystal layer 204.

In some examples, as shown in FIG. 3B, frame 102 can include a pin hole 308 to expose the solar cells enclosed within housing 304 to ambient light. Pin hole 308 can be configured to facilitate light entering housing 304 from a front side of the user (e.g., from positive Y direction) and to block light from other directions (e.g., from a side direction, from above or below the user, etc.) from entering housing 304. In some examples, pin hole 308 can have dimensions of 3 mm×3 mm.

Pin hole 308 can increase the sensitivity of solar cells 306 to light directly emitted from a light source (e.g., the sun, lamps, etc.) which can accurately represent the ambient light intensity, while decreasing the sensitivity of solar cells 306 to reflect light which does not accurately represent the ambient light intensity. Such arrangements can improve the correlation between the output of solar cells 306 (and the driver circuit's output) and the ambient light intensity. Moreover, pin hole 308 can also prevent exposing the entirety of the solar cells while allowing the solar cells to collect light, which can improve the visual appearance of eyewear 100 while preserving the eyewear's capabilities of sensing ambient light intensity and making corresponding adjustment to the light transmittance.

In some examples, eyewear 100 further includes a light guide 310 between pin hole 308 and the solar cells. Light guide 310 can receive a narrow beam of light via pin hole 308 and can project a sheet of light onto the solar cells, to more uniformly the light energy over the solar cells. Light guide 310 may include Acrylic material and can have a surface configured to diffuse light. A typical voltage range of the solar cell, based on the sheet of light received via light guide 310, can be between 0 to 2.1V.

Figure 3C:
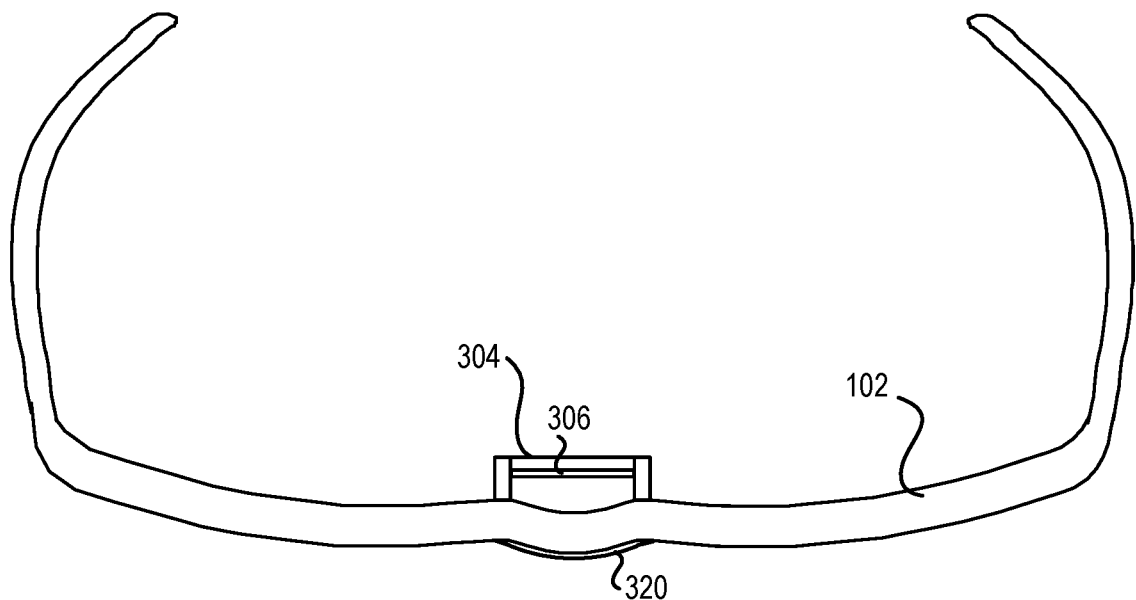
Figure 3C:
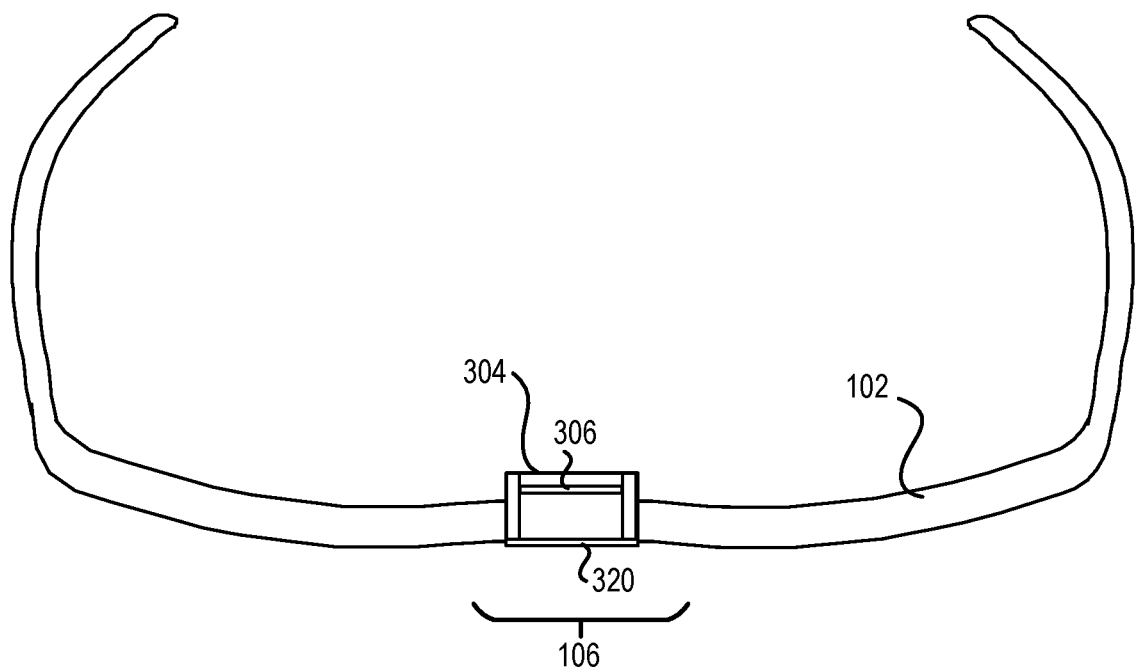
Figure 3D:
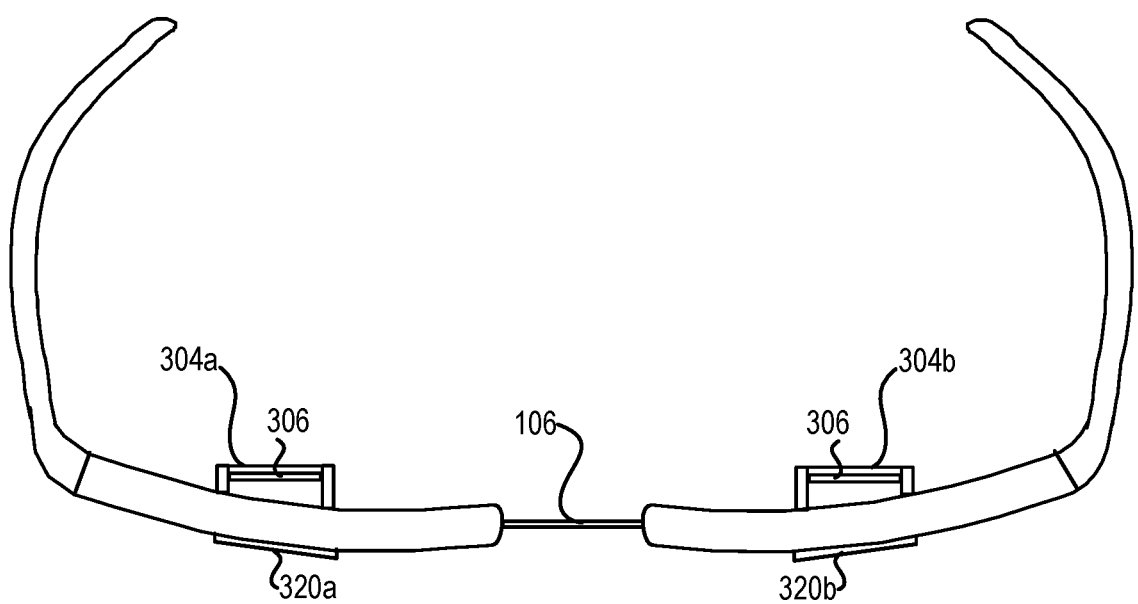

FIG. 3C and FIG. 3D illustrate other configurations of the solar cells and housing 304. As shown in FIG. 3C, a coating 320 can be placed on frame 102, on housing 304 (e.g., where housing 304 is part of connection structure 106 between two lens assemblies 104), and/or on lens assembly 104 as shown in FIG. 3D to partially cover housing 304. Coating 320 can be a darken coating and can be put on frame 102 and/or lens assembly 104 based on a sputtering process. Coating 320 can partially block the light and allow some light to enter housing 304 and solar cells 306. Such arrangements can partially cover housing 304 and solar cells 306 to improve the visual appearance of eyewear 100 without pin hole 308. Moreover, with the removal of pin hole 308, solar cells 306 can receive a uniform sheet of light without light guide 310. As a result, the size and weight of housing 304, as well as the overall size and weight of eyewear 100, can be reduced. The removal of pinhole 308 can also improve the flexibility of positioning of housing 304. In FIG. 3D, housings 304a and 304b (as well as solar cells 306) can be positioned behind, respectively, lens assemblies 104a and 104b and can be partially covered by coatings 320a and 320b to maximize the amount of light received by solar cells 306.

Figure 3E:
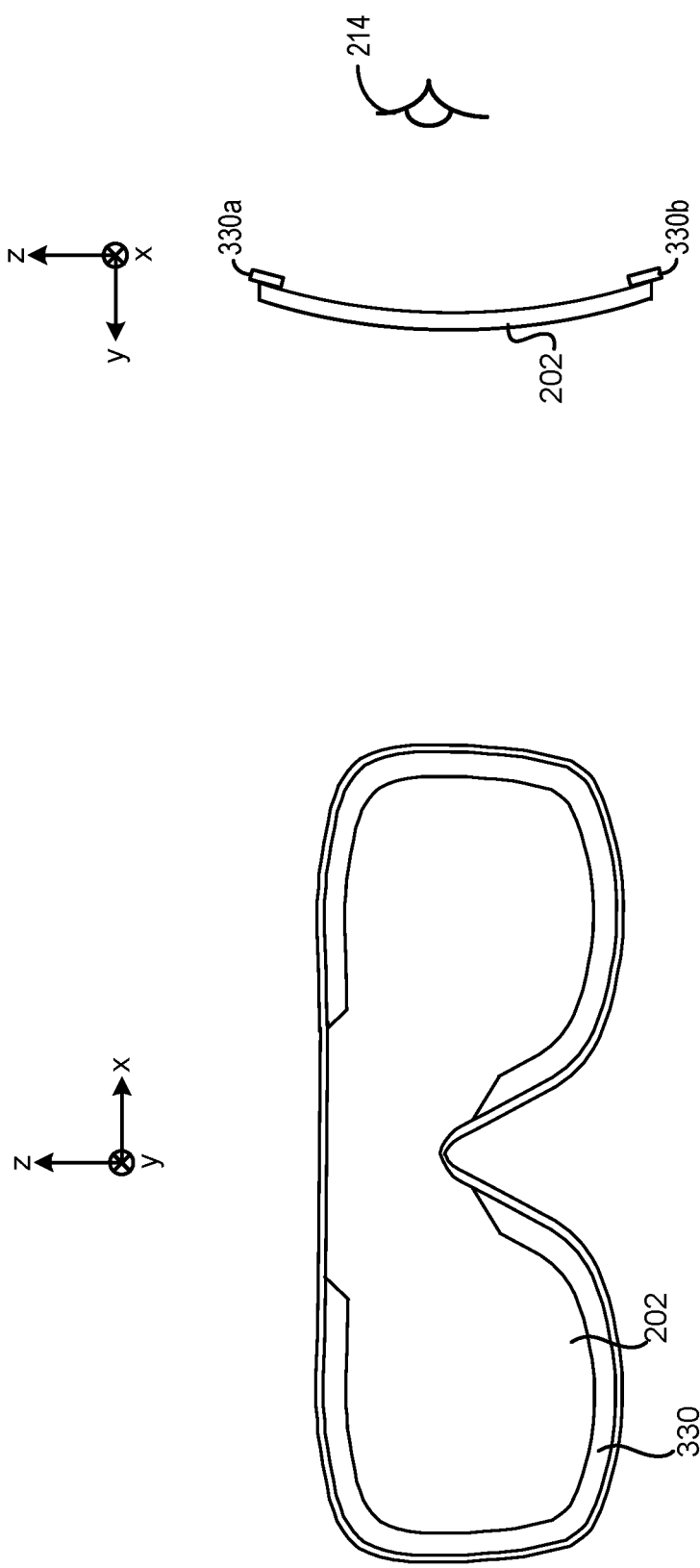

FIG. 3E illustrates another configuration of the solar cells. As shown in FIG. 3E, the solar cells can be in the form of one or more transparent solar membranes 330 (e.g., membranes 330a, 330b, etc.). In some examples, one or more transparent solar membranes 330 can be formed (e.g., by electroplating) on the edges (e.g., upper and lower edges, side edges, etc.) of lens 202 (of lens assembly 104) facing eye 214 of the user. The total surface of one or more transparent solar membranes 330 can also be configured based on the required range of voltages to be supplied by the driver circuit, which can be based on the range of transmittance to be provided by eyewear 100. Compared with the silicon solar cell described with respect to FIG. 3B-FIG. 3D, transparent solar membranes 330 can be integrated with lens 202 as part of lens assembly 104 and does not take up extra space, which enables frame 102 to be more compact and to have a lighter weight.

Figure 4A:
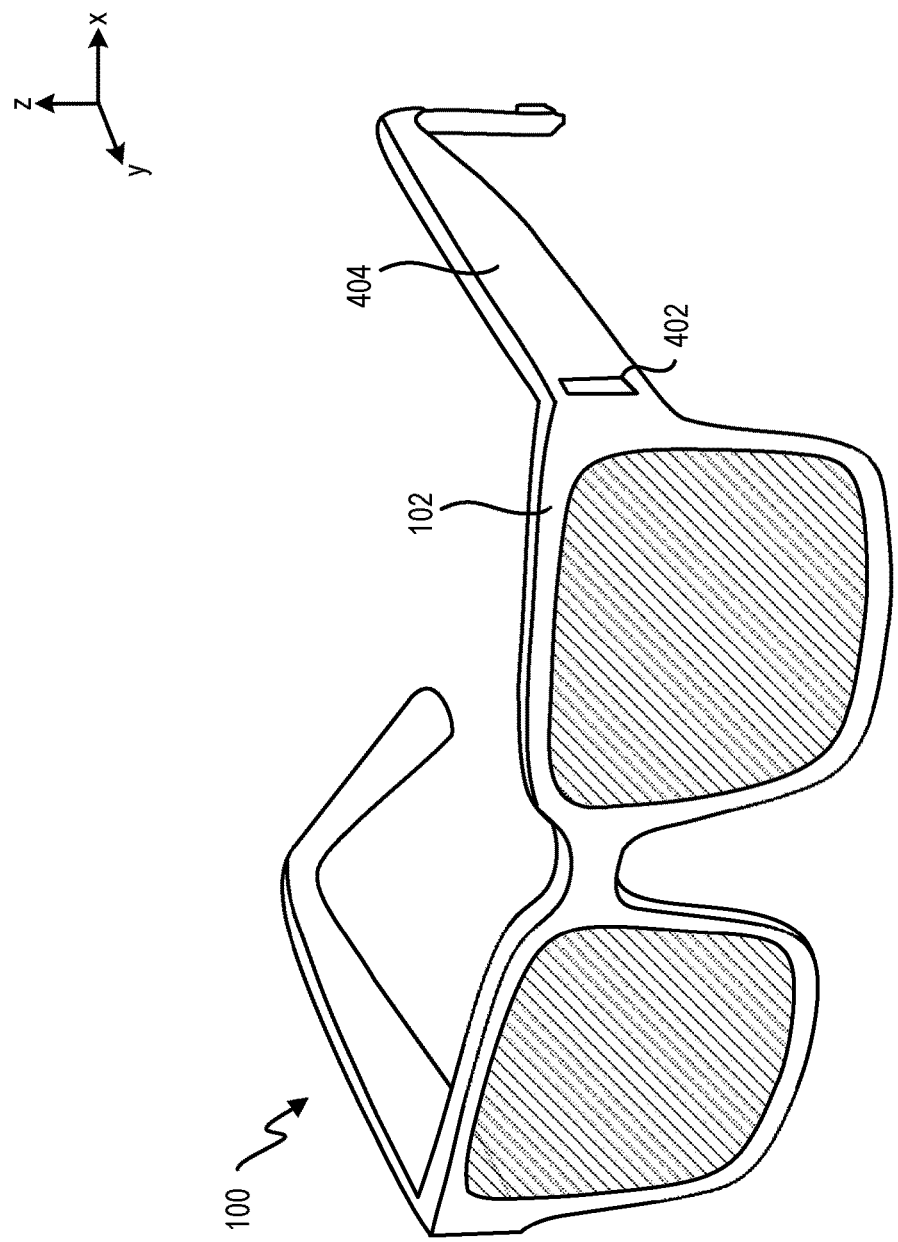
FIG. 4A, FIG. 4B, and FIG. 4C illustrates examples of a dimmable eyewear having user input/output interfaces, according to embodiments of the present disclosure.

Besides optical sensors (which may include photovoltaic cells), the driver circuit can also be manually controlled by the user to set the light transmittance of one or more lens assemblies 104. FIG. 4A illustrates an example of eyewear 100 having an input interface 402 to receive user's input to control the light transmittance. Input interface 402 can include, for example, a mechanical switch, a touch pad, etc., and can be located at any location on frame 102, temple 404 connected to frame 102, etc. The microcontroller of the driver circuit can output different voltages based on the user's input detected at input interface 402 to adjust the electric field applied across the liquid crystal layer and the light transmittance of lens assemblies 104. In some examples, a light transmittance range provided by manual control can be between 1% to 40%. The light transmittance range can be set based on the properties of the polarizers as explained above. Eyewear 100 also includes a battery, such as a lithium battery, to supply power to the driver circuit and to input interface 402. With the liquid crystal threshold voltage set at 0.8V, the power consumption of eyewear 100 can be at 0.25 mW. Under such operational conditions, a typical lithium battery can provide a battery life of about 120 hours.

Figure 4B:
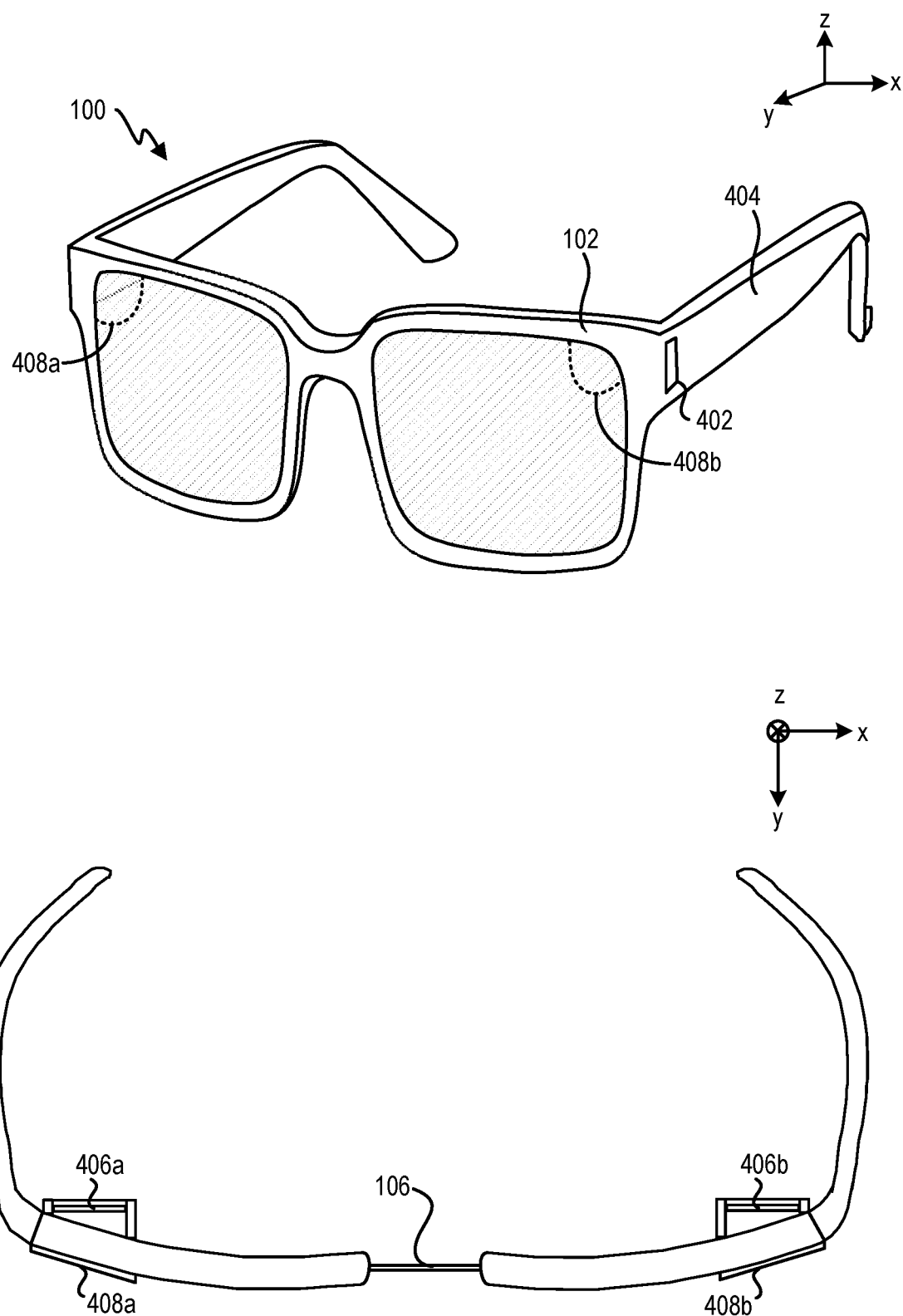

In addition to input interface 402, eyewear 100 may include other interface circuits to improve user experience. For example, as shown in FIG. 4B, eyewear 100 may include a pair of cameras 406 (e.g., 406a, 406b, etc.) that are positioned behind lens assemblies 104a and 104b and can capture light via lens assemblies 104a and 104b to generate images. In some examples, eyewear 100 may include coatings 408a and 408b overlaid on, respectively, cameras 406a and 406b. The coatings may include, for example, an Indium Tin Oxide (ITO) layer etched on a substrate of liquid crystal layer 204 of each lens assembly. The ITO layer can form a region that operate separately from the rest of liquid crystal layer 204. For example, the ITO layer can filter and control a wavelength range of the light that goes through liquid crystal layer 204 and captured by cameras 406a and 406b. As another example, the ITO layer can also form a separate pair of electrodes over the region of liquid crystal layer 204 overlaid by the ITO layer. Such arrangements allow the light transmittance of the region of liquid crystal layer 204 overlaid by the ITO layer to be controlled independently from the rest of liquid crystal layer 204 to, for example, improve the quality of the imaging operation by cameras 406a and 406b.

Figure 4C:
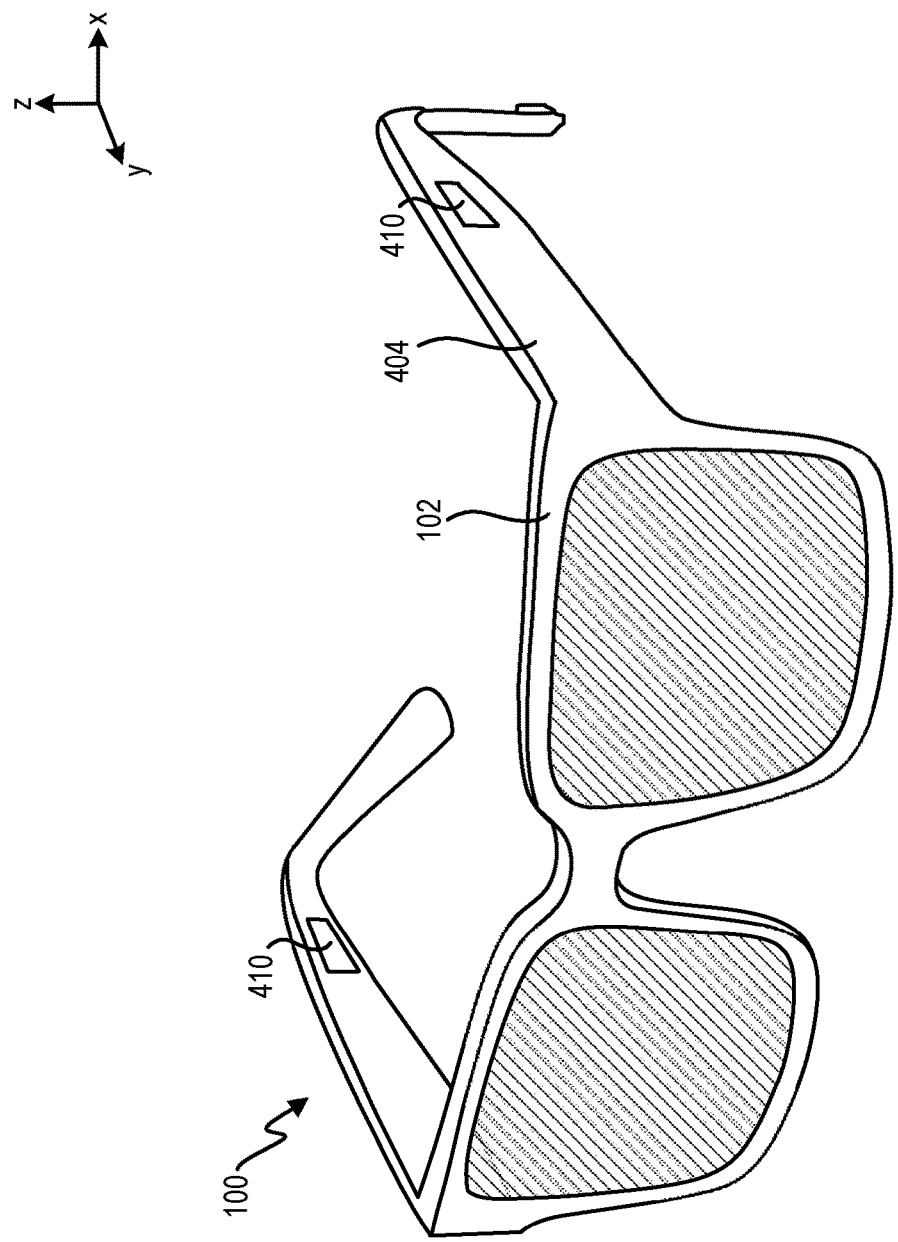

Moreover, referring to FIG. 4C, eyewear 100 may also include an interface circuit 410 in temple 404. Interface circuit 410 may include, for example, a wireless interface circuit (e.g., based on the (e.g., Bluetooth® standard) and an audio input/output interface (e.g. a microphone, an audio speaker, etc.). The wireless interface circuit can receive, for example, radio signals carrying audio data, and provide the audio data to the audio speaker for outputting as audio signals. The wireless interface circuit can also transmit the image data captured by cameras 406a and 406b, and by the microphone, to other devices.

Besides adjustable light transmittance, additional techniques are proposed to further improve user experience provided by eyewear 100, such as to mitigate visual artifacts caused by first and second polarizer layers 206 and 208. As described above, lens assembly 104 may include first polarizer layer 206 and second polarizer layer 208 to sandwich liquid crystal layer 204 in between to create adjustable light transmittance. Light transmittance can be at a minimum when the liquid crystal molecules in liquid crystal layer 204 are aligned and the polarized light (polarized by first polarizer layer 206) is not rotated and become perpendicular to the polarization axis of second polarizer layer 208. In such a case, much of incident light 210 can be absorbed by second polarizer layer 208, which can minimize the light transmittance of lens assembly 104.

Figure 5A:
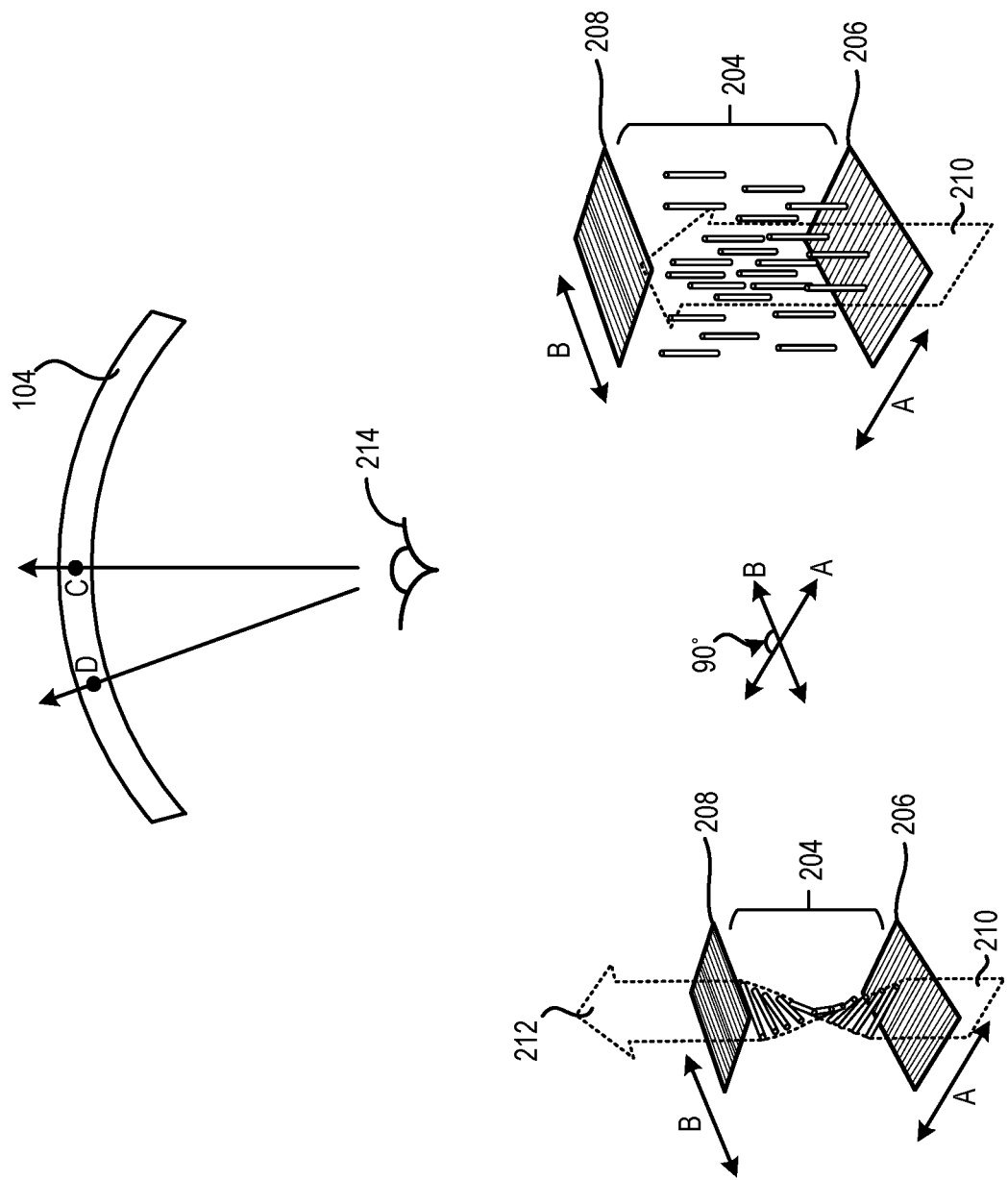
FIG. 5A and FIG. 5B illustrate examples of a lens assembly of the dimmable eyewear of FIG. 1A-FIG. 1D, according to embodiments of the present disclosure.

The light absorption rate of second polarizer layer 208, however, can vary based on an incident angle of incident light 210 with respect to second polarizer layer 208, which can create visual artifacts as the user sees through lens assembly 104 at different viewing angles and affect the visual perception of the user. FIG. 5A illustrates such an example. As shown in FIG. 5A, the user may look through different points of lens assembly 104 at different angles, with liquid crystal layer 204 configured to provide minimum light transmittance. When the user looks through a point at the center of lens assembly 104 (marked by label "C"), the absorption rate of second polarizer layer 208 can be highest, whereas when the user looks through a point near a side of lens assembly 104 (marked by label "D"), the absorption rate of second polarizer layer 208 can be reduced. Because of the difference in the absorption rate, the center of lens assembly 104 (where the light absorption rate is at the highest) may appear as a black belt compared with the side of lens assembly 104. The appearance of the black belt can affect the visual perception of the user via eyewear 100 and can degrade user experience.

Figure 5B:
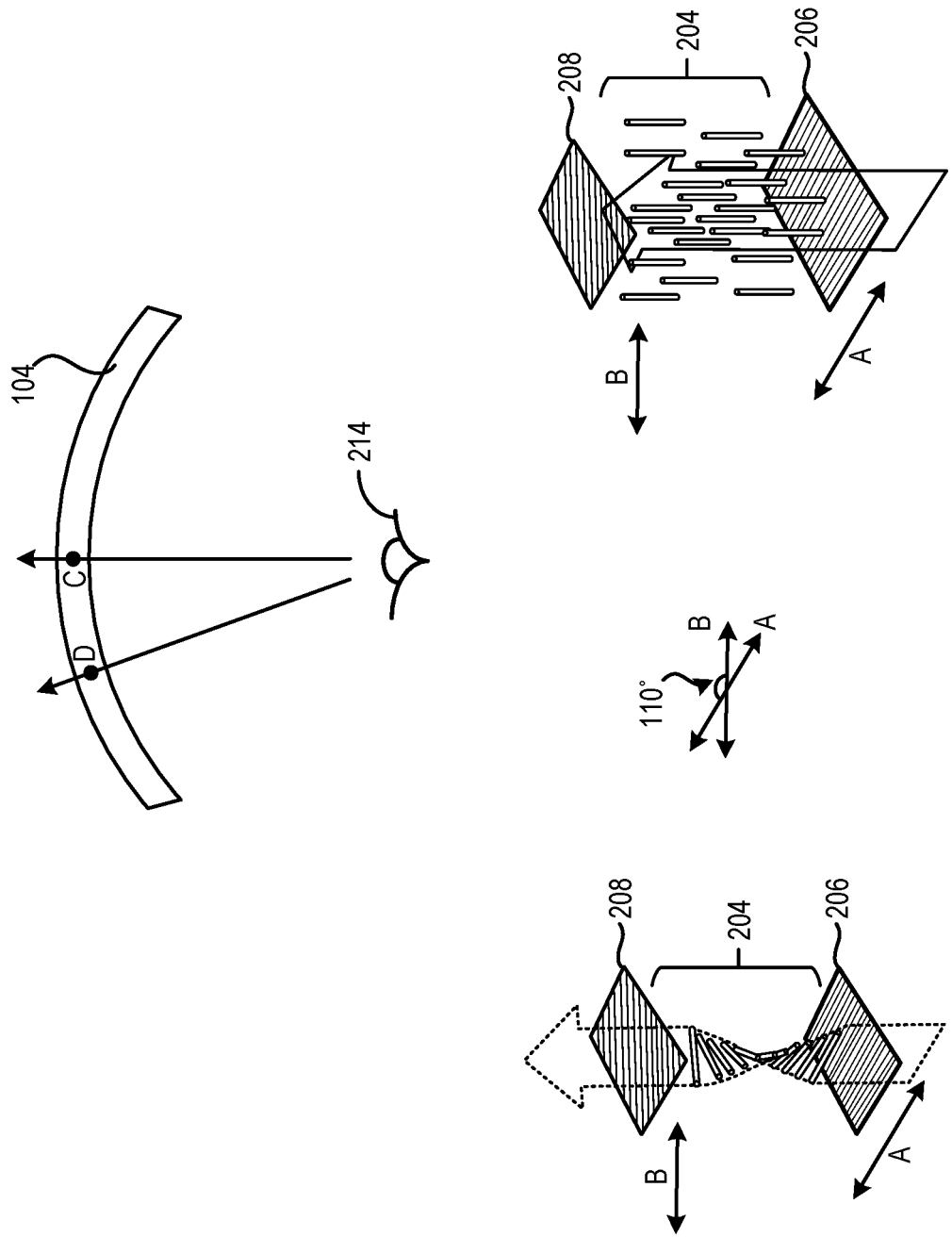

To reduce the appearance of the dark band, as shown in FIG. 5B, first polarizer layer 206 and second polarizer layer 208 can be oriented such that their polarization axes are not perpendicular to each other. With such arrangements, even when the liquid crystal molecules are aligned and do not rotate the polarized light from first polarizer layer 206, the polarized light is not fully aligned with the absorption axis of second polarizer layer 208 and is not absorbed at the maximum absorption rate. Such arrangements can reduce the absorption rate difference of second polarizer layer 208 between the center and other parts of lens assembly 104, which can reduce or eliminate the appearance of black belt at the center of lens assembly 104. In some examples, first polarizer layer 206 and second polarizer layer 206 can be oriented such that their polarization axes form a 110 degree angle. In a case where maximum light transmittance is to be provided, liquid crystal layer 204 can be configured to rotate the polarized light by the 110 degree angle to match the 110 degree angle that separates the polarization axes of first polarizer layer 206 and second polarizer layer 206.

Figure 6A:
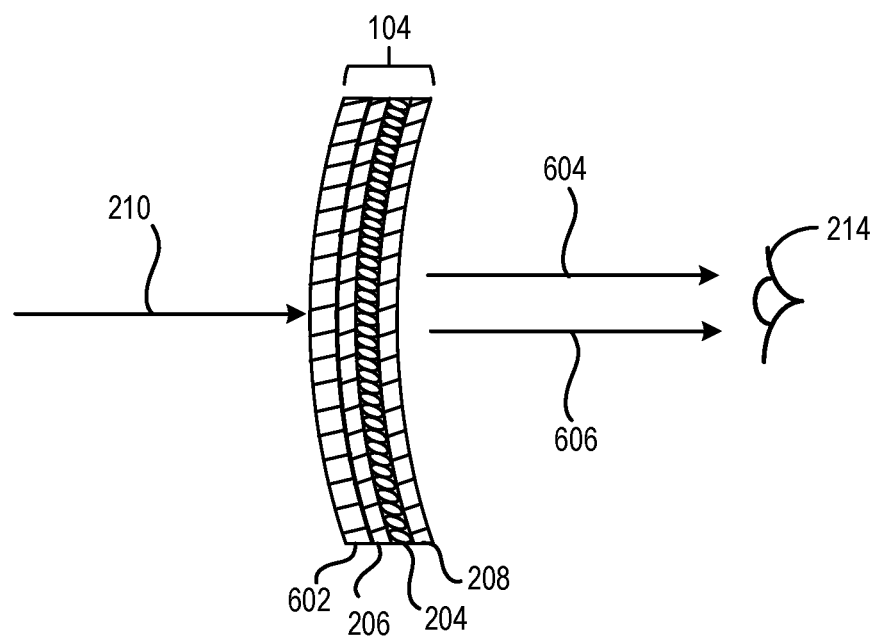
FIG. 6A, FIG. 6B, and FIG. 6C illustrate examples of components of the example dimmable eyewear of FIG. 1A-FIG. 3E according to embodiments of the present disclosure.

In addition, other components of lens assembly 104 can be configured to compensate for visual artifacts created by first polarizer layer 206 and second polarizer layer 208. For example, a combination of first polarizer layer 206 and second polarizer layer 208 may selectively absorb light of particular wavelength range in a case where their absorption axes are perpendicular to each other. As a result, the user may see blue light via first polarizer layer 206 and second polarizer layer 208, whereas lens assembly 104 may also appear externally as blue, both of which can degrade user experience. To compensate for the visual artifacts created by the selectively absorption of light by first polarizer layer 206 and second polarizer layer 208, as shown in FIG. 6A, lens 602 can be configured to selectively pass through orange light 604 (e.g., light of wavelength range 590-635 nanometers (nm)), while blocking light of other wavelengths. Meanwhile, first polarizer layer 206 and second polarizer layer 208 can pass blue light 606, which can combine with orange light 604 to form white/transparent light when the light transmittance of lens assembly 104 is at the maximum. In a case where the light transmittance of lens assembly 104 is reduced, the user can also perceive dark color (e.g., grey, greyish black, etc.) via lens assembly 104 due to the combination of orange light 604 and blue light 606 and can have similar experience as wearing conventional sunglasses.

Figure 6B:
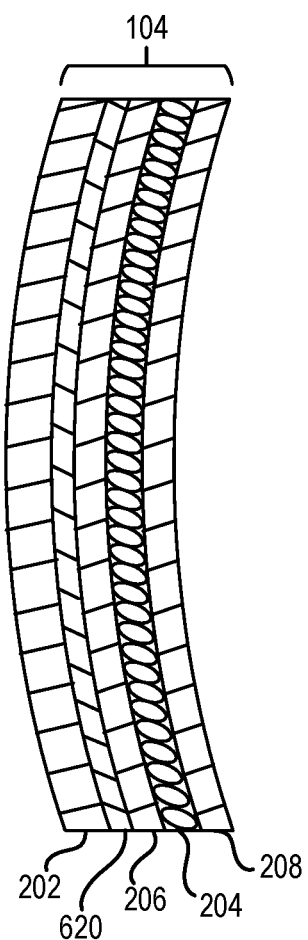

Moreover, as shown in FIG. 6B, a polyester film 620, such as Super Retarder Film (SRF), can be added between lens 202 and first polarizer layer 206. Polyester film 620 can be added to reduce or eliminate rainbow mura perceived by the user. The rainbow mura can be caused by uneven birefringence at lens 202, which can convert linearly polarized light into circular polarized light. The circular polarized light can undergo interference at first polarizer layer 206 to form the rainbow mura. To reduce the rainbow mura, polyester film 620 can convert the circular polarized light from lens 202 into linearly polarized light, which can reduce the interference and the formation of rainbow mura as the light passes through first polarizer layer 206.

Figure 6C:
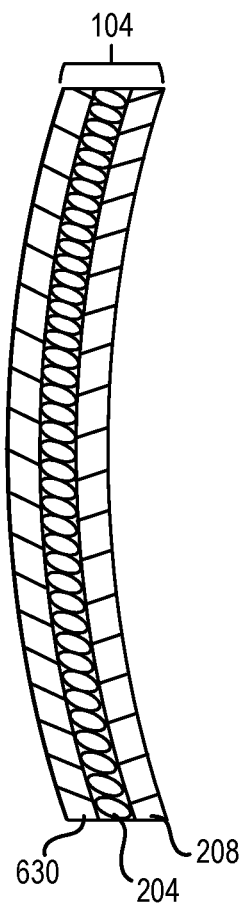

Moreover, as shown in FIG. 6C, a lens 630 having diffraction gratings can be used in place of lens 202 and first polarizer layer 206. Lens 630 can be made of quartz. The diffraction gratings can block light having a polarization axis parallel with the gratings and can provide a polarization effect similar to first polarizer layer 206. The polarization axis of lens 630 can be perpendicular to second polarizer layer 208, which enables adjustment of light transmittance of lens assembly 104 based on adjusting the rotation angle by liquid crystal layer 204.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations described. The apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

I claim:

1. An eyewear comprising:
   a lens assembly including:
      a lens, and
      a liquid crystal layer coupled with the lens;
   a driver circuit coupled with the liquid crystal layer, the driver circuit configured to apply a signal to the liquid crystal layer based on an indication of an intensity of ambient light to control a light transmittance of the lens assembly;
   a sensor configured to generate a sensor output based on the intensity of the ambient light, the sensor comprising one or more solar cells, wherein the driver circuit is configured to control the signal based on the sensor output; and
   a housing to enclose the one or more solar cells and the driver circuit, the housing further comprising an opening to expose the one or more solar cells to the ambient light; and
   a light guide positioned between the opening and the one or more solar cells, wherein the light guide is configured to:
      receive a beam of ambient light received via the opening, the beam of ambient light having a first width;
      convert the beam into a sheet of ambient light, the sheet of ambient light having a second width greater than the first width; and
      direct the sheet of ambient light towards the one or more solar cells.

2. The eyewear of claim 1, wherein the lens assembly further includes a first polarizer layer and a second polarizer layer;
   wherein the lens and the liquid crystal layer are sandwiched between the first polarizer layer and the second polarizer layer; and
   wherein the liquid crystal layer comprises twist-nematic (TN) liquid crystal devices.

3. The eyewear of claim 2, wherein the lens is configured to selectively pass visible light of a frequency range associated with an orange color, such that light passed by the lens and by the first and second polarizer layers combine to have a white color.

4. The eyewear of claim 2, wherein the lens assembly further comprises a membrane between the lens and the first polarizer layer; and wherein the membrane is configured to reduce a birefringence effect exerted by the lens on the ambient light transmitted by the lens.

5. The eyewear of claim 2, wherein the TN liquid crystal devices have a twist angle range between 0 and 90 degrees; and
wherein a first absorption axis of the first polarizer layer and a second absorption axis of the second polarizer layer forms 90 degrees.

6. The eyewear of claim 2, wherein the TN liquid crystal devices have a twist angle range between 0 and 110 degrees; and
wherein a first absorption axis of the first polarizer layer and a second absorption axis of the second polarizer layer forms 110 degrees.

7. The eyewear of claim 1, wherein the liquid crystal layer includes at least one of: Guest-Host liquid crystal devices, electrically controlled birefringence (ECB) crystal devices, or Pi-cells.

8. The eyewear of claim 7, wherein the liquid crystal layer is sandwiched between a first substrate and a second substrate;
wherein the first substrate and the second substrate have different rubbing arrangements;
wherein an orientation of liquid crystal molecules of the liquid crystal layer vary between a homogeneous planar orientation and a homeotropic orientation in response to a signal applied by the driver circuit.

9. The eyewear of claim 1, further comprising one or more transparent membranes comprising the one or more solar cells; and wherein the one or more transparent membranes are attached on at least one of the lens or the liquid crystal layer.

10. The eyewear of claim 1, wherein the lens assembly is a first lens assembly comprising a first lens and a first liquid crystal layer; wherein the eyewear comprises a second lens assembly comprising a second lens and a second liquid crystal layer; wherein the eyewear comprises a connection structure to connect the first lens assembly and the second lens assembly; and wherein the housing is attached on the connection structure.

11. The eyewear of claim 1, wherein the housing is attached on the lens assembly.

12. The eyewear of claim 1, wherein the light guide comprises an Acyclic material.

13. The eyewear of claim 1, further comprising a coating to partially cover the housing.

14. The eyewear of claim 1, further comprising a switch that enables a user to select the light transmittance of the lens assembly based on intensity of the ambient light; and
wherein the driver circuit is configured to control the light transmittance of the lens assembly based on the selection from the switch.

15. The eyewear of claim 1, further comprising:
a camera positioned behind the lens assembly, the camera configured to receive light via the lens assembly to generate images; and
a coating overlaid on a portion of the lens assembly and the camera, the coating configured to set an optical property of the portion of the lens assembly independently from the rest of the lens assembly.

16. The eyewear of claim 1, further comprising at least one of:
a wireless interface to transmit and to receive radio signals; or
an audio interface to input and output audio signals.

* * * * *